US006735527B1

(12) United States Patent
Levin

(10) Patent No.: US 6,735,527 B1
(45) Date of Patent: May 11, 2004

(54) 3-D PRESTACK/POSTSTACK MULTIPLE PREDICTION

(75) Inventor: Stewart A. Levin, Centennial, CO (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 10/374,368

(22) Filed: Feb. 26, 2003

(51) Int. Cl.$^7$ .................................................. G01V 9/00
(52) U.S. Cl. .............................. 702/14; 702/16; 703/10
(58) Field of Search ........................... 702/14, 16, 10; 703/5, 10; 367/73, 83, 53

(56) References Cited

U.S. PATENT DOCUMENTS 5,587,967 A * 12/1996 Ferber .......................... 367/53
6,021,379 A * 2/2000 Duren et al. .................. 702/16
6,263,284 B1 * 7/2001 Crider et al. ................. 702/14

OTHER PUBLICATIONS

H.J. Lehmann and W. Houba, Practical Aspects of the Determination of 3–D Stacking Velocities, 1985, Geophysical Prospecting vol. 33, pp. 34–51.

Anstey and Newman, "The Sectional Autocorrelogram and the Sectional Retrocorrelogram", 1968, Geophysical Prospecting, v. 14, pp. 389–426.

* cited by examiner

Primary Examiner—John Barlow
Assistant Examiner—Victor J. Taylor
(74) Attorney, Agent, or Firm—Meyertons Hood Kivlin Kowert & Goetzel, P.C.; Jeffrey C. Hood; Mark S. Williams

(57) ABSTRACT

System and method for analyzing seismic data from a formation. Stacked seismic data are provided, including a plurality of stack traces, e.g., by collecting seismic data from source and receiver locations and stacking the collected seismic data to produce the stacked seismic data. 3-dimensional (3-D) prestack traces are generated from the plurality of stack traces, e.g., by performing inverse moveout of stack traces, e.g., in a specified neighborhood, at common-depth-points, e.g., by inverse normal moveout, ray tracing, spike synthesis, etc. The inverse moveout corrected traces are convolved to compute predicted multiples which are useable in analyzing the formation. The multiples may be adaptively subtracted from the stacked seismic data, or optionally, from prestack data, to generate processed seismic data useable in analyzing the formation, e.g., for petroleum production potential. Dip moveout (DMO) corrected seismic data may be used, where DMO velocities are adjusted by dividing by cosine of the dip angle.

51 Claims, 30 Drawing Sheets

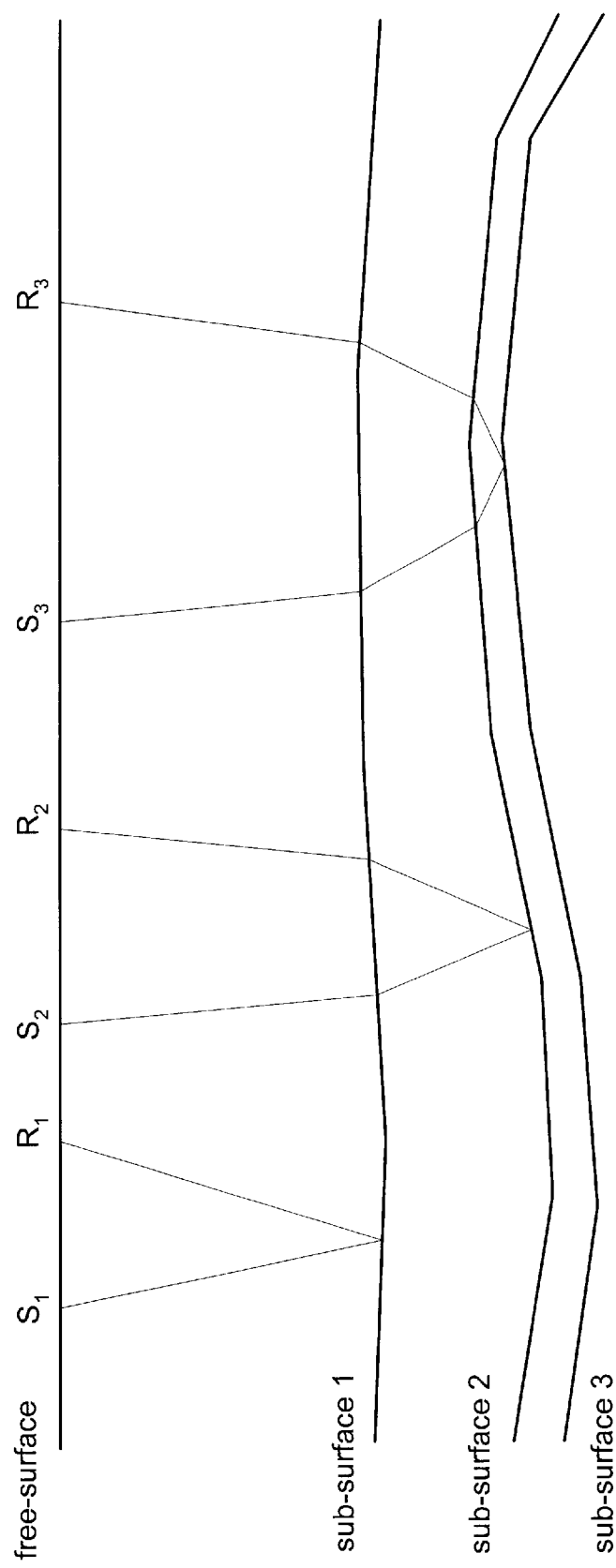

3D Input

3-D PRESTACK/POSTSTACK MULTIPLE PREDICTION

FIELD OF THE INVENTION

The present invention generally relates to seismic exploration, and more particularly to accurate prediction of 3-D acoustic reverberations or multiples for the purpose of coherent noise suppression and improved interpretation of 3-D seismic data.

DESCRIPTION OF THE RELATED ART

Seismic exploration involves the study of underground formations and structures. In seismic exploration, one or more sources of seismic energy emit waves into a subsurface region of interest, such as a geologic formation. These waves enter the formation and may be scattered, e.g., by reflection or refraction. One or more receivers sample or measure the reflected waves, and the resultant data are recorded. The recorded samples may be referred to as seismic data or a "seismic trace". The seismic data contain information regarding the geological structure and properties of the region being explored. The seismic data may be analyzed to extract details of the structure and properties of the region of the earth being explored.

In general, the purpose of seismic exploration is to map or image a portion of the subsurface of the earth (a formation) by transmitting energy down into the ground and recording the "reflections" or "echoes" that return from the rock layers below. The energy transmitted into the formation is typically sound energy. The downward-propagating sound energy may originate from various sources, such as explosions or seismic vibrators on land, or air guns in marine environments. Seismic exploration typically uses one or more sources and typically a large number of sensors or detectors. The sensors that may be used to detect the returning seismic energy are usually geophones (land surveys) or hydrophones (marine surveys).

During seismic exploration (also called a seismic survey), the energy source may be positioned at one or more locations near the surface of the earth above a geologic structure or formation of interest, referred to as shotpoints. Each time the source is activated, the source generates a seismic signal that travels downward through the earth and is at least partially reflected. Seismic signals are partially reflected from discontinuities of various types in the subsurface, including reflections from "rock layer" boundaries. In general, a partial reflection of seismic signals may occur each time there is a change in the elastic properties of the subsurface materials. Reflected seismic signals are transmitted back to the surface of the earth, where they are recorded as a function of traveltime. Reflected seismic signals are typically recorded at a number of locations on the surface. The returning signals are digitized and recorded as a function of time (amplitude vs. time).

FIG. 1A illustrates a seismic source S at the earth's surface, referred to as the free surface, generating reflected seismic signals from a sub-surface which are measured at four receivers, $R_1$–$R_4$, as shown. One should note that all free surface reflected energy acts as a secondary source of seismic signals from the points of reflection. FIG. 1B illustrates various examples of primary reflection raypaths, where the signal refracts at each boundary between layers, i.e., at each sub-surface reflector. Note that primary reflections do not involve downward reflections from the free surface or any of the sub-surface reflectors.

In seismic analysis, the term "multiples" refers to multiply-reflected seismic energy, or any event in seismic data that has incurred more than one reflection in its travel path. Depending on their time delay from the primary events with which they are associated, multiples are commonly characterized as short-path, implying that they interfere with the primary reflection, or long-path, where they appear as separate events. Multiples from the water bottom (the interface of the base of water and the rock or sediment beneath it) and the air-water interface are common in marine seismic data. The presence of multiples may obscure or interfere with primary reflection signals and may thus act as "noise" when analyzing seismic data.

FIGS. 2A–2D illustrate a variety of multiple events, as are well known in the art. FIG. 2A illustrates water layer reverberations, where the signals are "trapped" in the water layer between two strong reflectors, specifically the free surface and the bottom of the water layer. These multiples tend to decay slowly and obscure the primary reflection energy from deeper reflectors or sub-surfaces. FIG. 2B illustrates slightly weaker multiple events, referred to as "peg-leg" multiple events, characterized by an additional roundtrip through the water layer just after emission (source-side) or just before detection (receiver-side). FIG. 2C illustrates a variety of what are known as "remaining" surface-related multiple events, where the first and last upward reflections are below the first (water) layer, and there is at least one reflection at the free surface in between. These multiple events are typically weaker than the water layer reverberations and the peg-leg multiples, but may be considerable if a highly reflective structure (e.g., salt or basalt) is involved. Finally, FIG. 2D illustrates "internal" or "interbed" multiple reflections, which are generally much weaker than the surface-related multiple reflections of FIGS. 2A–2C. Internal multiple reflections have a downward reflection at a boundary in the subsurface. If the primary reflection events have reflection amplitudes on the order of the reflection coefficient r, then the first order surface-related multiples have amplitudes on the order of $r^2$, and the first order internal multiples of $r^3$, where $|r|<1$. However, in many common geologic settings of commercial interest in hydrocarbon exploration, multiple events will interfere with less energetic primary events from deeper reflectors, and even internal multiples may obscure primary reflections from deeper reflecting boundaries.

FIG. 3 illustrates the time relationship between the arrival of a source sample at a receiver R, referred to as the sample time, and the arrival times of a multiple reflection from some representative subsurface reflector. Note that time increases downward along the vertical axis shown. As FIG. 3 illustrates, the original sample produces the multiple event shown to the right of FIG. 3. These arrival times are those of a primary reflection from that subsurface reflector due to a source located at the receiver location, but delayed by the sample's arrival time. Note that the sample may itself be a measurement of a multiply-reflected signal from a source located elsewhere, and that any energy reflected from the surface is, according to the principle of superposition, considered to be another source. In discrete terms, FIG. 3 illustrates the concept that the response of any sample of recorded upcoming energy is a delayed copy of a record from an impulsive seismic source signal at that recording location, appropriately scaled by the sample's amplitude and the free surface reflection coefficient.

Multiple source activation/recording combinations may be collected to create a near continuous profile of the subsurface. In a two-dimensional (2-D) seismic survey, the recording locations are generally laid out along a single line. In a three dimensional (3-D) survey the recording locations are a really distributed across the surface. In simplest terms, a 2-D seismic line can be thought of as providing a vertically-oriented cross sectional picture of the earth layers as they exist beneath the recording locations. A 3-D survey produces a data "cube" or volume that is, at least conceptually, a 3-D picture of the subsurface that lies beneath the survey area. In reality, both 2-D and 3-D surveys interrogate some volume of earth lying beneath the area covered by the survey.

After the seismic data have been collected, the seismic data may be "imaged", analyzed, or otherwise processed to produce a seismic profile or pattern indicating various characteristic structures or signatures which may correlate with known geological formations. Seismic processing generally refers to alteration of seismic data to suppress noise, enhance signal and migrate seismic events to the appropriate location in space. Processing steps typically include analysis of velocities and frequencies, static corrections, deconvolution, normal moveout, dip moveout, stacking, and migration. The migration step can be performed before or after stacking. Seismic processing facilitates better interpretation because subsurface structures and reflection geometries are more apparent. A number of seismic exploration techniques may be performed to analyze the seismic data, including pre-stack imaging, pre-stack migration and normal moveout.

Moveout refers to the difference in the arrival times or traveltimes of a reflected wave measured by receivers at two different offset locations. Said another way, moveout refers to arrival times of events with increasing source-to-receiver offset. Normal moveout (NMO) is moveout caused by the separation between a source and a receiver in the case of a flat reflector under a homogeneous overburden. NMO may also be considered an approximation of moveout by hyperbolic trajectories. Dip moveout (DMO) occurs as an effect in addition to NMO when reflectors dip. Inverse moveout refers to the process of predicting and restoring arrival times with offset. Inverse normal moveout is a simplified process that uses hyperbolas to restore the arrival times.

Convolution is a mathematical operation on two functions that represents the process of linear filtering. Convolution can be applied to any two functions of time or space (or other variables) to yield a third function, the output of the convolution. Although the mathematical definition is symmetric with respect to the two input functions, it is common in signal processing to say that one of the functions is a filter acting on the other function. The response of many physical systems can be represented mathematically by a convolution. For example, a convolution is commonly used to model the filtering of seismic energy by the various rock layers in the Earth.

As mentioned above, the presence of multiples may complicate the analysis of seismic data sets by creating reflection arrivals masking or masquerading as primary reflections for a formation of interest. Thus, various techniques have been developed for removing or at least ameliorating the effects of multiples from seismic data. An approach called surface-related multiple attenuation (SRMA), devised in 1-D at Stanford University in the late-1970's and extended and developed at Delft University of Technology in the mid-1980s, referred to herein as the Delft approach, is a prediction and subtraction process, where multiples are first predicted, then subtracted from the seismic data. The Delft surface-related multiple attenuation algorithm and its various extensions to subsurface interbed reverberations are considered by practitioners of the art of seismic data processing to be powerful tools for the prediction and attenuation of multiple reflections in 2-D prestack seismic data. The Delft surface-related multiple approach may be understood by means of an algebraic relationship. In the Delft approach, each shot record approximates the response of the subsurface to an ideal impulsive source at the shot location. Each trace (usually multiplied by −1, the idealized free surface reflection coefficient) approximates energy being reflected downward from the free surface. Convolving the trace with a shot record whose source lies at, or nearby, the receiver location therefore approximates the response of the subsurface to the free surface reflected trace energy. This relationship may be expressed as follows:

$$[S+(-D)]*R=D \tag{1}$$

where S are the actual source signals, D are the upcoming recorded data, −D are the free surface reflected data, and R is the response of the subsurface to ideal impulsive sources without the free surface reflector. In other words, the recorded data are the response of the subsurface to ideal impulsive sources without the free surface reflector to the initial source illumination plus the downward-reflected data. Assuming one can measure or estimate the source field, S, one may solve this equation for R and thereby eliminate all free-surface multiples.

To highlight how powerful this concept is, FIG. 4 illustrates some of the complexities that may result from non-parallel boundaries between subsurface layers, where the primary reflection path from the source $S_0$ to the receiver $R_1$ is denoted by the heavy line labeled Recorded Data. Note the various other signal paths that propagate through reflection and refraction at the boundaries of subsurface 1 and subsurface 2. Note also that the signal reflected from the free surface at the location of the receiver $R_1$ is considered to be a secondary source $S_1$. This signal may be convolved with a shot coincident with the receiver location. In reference to FIG. 4, the Delft algorithm may be stated thus: each recorded trace is convolved with a shot record, possibly interpolated, from a shot at that trace's receiver location. Superimposing these individual records across the whole survey line produces a prediction of the surface-related multiples for the line. These predicted multiples are then adaptively subtracted from the original data to suppress surface-related multiples.

It should be noted that most 2-D implementations of the Delft approach take advantage of the near-continuous linear recording geometry of normal 2-D seismic data acquisition by invoking the "principle of reciprocity" wherein a source activated at location S and recorded at receiver location R produces the same signal as the same source activated instead at location R and recorded by the same receiver repositioned at location S. In other words, sources may be mathematically interchanged with receivers, say in a computer, to effectively enlarge the recording geometry of the original near-continuous profile.

The relationship (1) holds true for 3-D as well as 2-D or 1-D earth models. However, in 3-D, recording cables need to be replaced by large areal recording arrays. In other words, to directly deploy the Delft approach in 3-D, data would have to be recorded over an areal grid (a 2-D grid, such as a rectangular grid) from shots distributed over the grid, i.e., shotpoints and receivers would be required over the entire grid. This type of field acquisition, while technically possible, is simply too expensive with current acquisition technologies to justify for everyday petroleum exploration. Thus, while in theory the Delft approach can be directly applied in three dimensions, the practical cost of acquiring a dense coverage of areal shot records has historically made this extension almost purely of theoretical interest.

Various researchers have attempted to adapt the Delft approach to swaths of parallel towed streamers where there is at least some limited areal receiver coverage, for example, by estimating some local crossdip and warping the data to compensate for the out-of-plane effects, by extrapolating the data to a wider and denser crossline coverage, or by implementing an anti-aliased summation within the towed streamer swath to compute a gracefully-incomplete 3-D Delft response. However, none of these attempts truly overcomes the severe aperture limits of real world data acquisition, and none has truly addressed the issues related to diffracted multiples, which are inherently of a fully 3-D nature.

Thus, improved systems and methods are desired for performing 3-D seismic analysis and processing of 3-D multiples.

SUMMARY

Various embodiments of systems and methods for predicting or estimating 3-D multiples from 3-D stacked seismic data are presented. In one embodiment, prestack seismic data may be received, e.g., directly from a plurality of receivers, e.g., via wired or wireless network, satellite, telephone, delivered storage medium, or any other means of transfer, or from an intermediate system, e.g., a third party. A stack of data, i.e., stacked seismic data, and a corresponding stacking velocity field may be generated from the prestack data, where the stacked data includes a plurality of stack traces. Each stack trace corresponds to a plurality of prestack source and receiver location pairs. The prestack source and receiver location pairs may be associated with common depth point (CDP) traces which are used to create the stack trace. However, it is noted that the prestack source and receiver pairs are not necessarily associated with CDP traces. The plurality of stack traces may be organized into a 3-D stacked volume, referred to as a "cube", as is well known in the art. Alternatively, the stacked data may be received, i.e., the received seismic data may already be stacked.

One important feature of numerous embodiments is that 3-D areal prestack data are generated from the stack traces. In a preferred embodiment, prestack gathers may be generated from each stacked trace by inverse moveout according to an azimuthally-dependent stacking velocity field, e.g., using a hyperbolic fanout of the stacking velocities, ray tracing seismic signals with a velocity and reflector model, or any other means of performing inverse moveout of the stacked trace.

Then, Delft 3-D multiple prediction may be applied to the generated 3-D areal prestack data to generate predicted multiples, as is well known in the art. The principle of reciprocity may be used to interchange the source and receiver locations of these generated 3-D areal prestack data whenever it may be convenient for data or computational management.

Finally, the results of the above process, i.e., the predicted multiples, may be output. For example, the predicted multiples may be output to storage, to an external system, e.g., to another computer system over a network, or to a display device, such as a computer monitor or printer.

It should be noted that simply applying the Delft technique in 3-D may be computationally expensive. For example, in 2-D, the Delft computations can require days to complete on a single computer system, and may require hours to compute on a large PC cluster. The 3-D computations could easily be a million times more compute-intensive than the 2-D computations. Thus, a number of tradeoffs or compromises may be made to allow useful 3-D multiple predictions to be made in a small fraction of the time otherwise required.

As an example, in one embodiment, each stacked trace may be fanned out only to a user-specified maximum offset. Said another way, the user may specify a maximum fanout distance from the location of each stacked trace, thereby specifying an aperture or neighborhood around the location to be used in the process. Since the computational cost is proportional to the square of this distance, significant time savings may be attained.

Another example of a compromise or restriction is to compute only the zero-offset traces in the 3-D Delft multiple prediction step, instead of computing all offsets and azimuths and then stacking the resulting prestack multiple predictions, thereby substantially reducing the number of required computations.

Although each of the above restrictions generally reduces one's ability to accurately predict some classes of free-surface multiples, the tradeoffs are justifiable when the key multiples of interest are surface peglegs or pure surface multiples generated from moderately-dipping subsurface reflectors.

Under the restrictions described above, the algorithm for 3-D prestack/poststack multiple prediction is straightforward. 3D stacked seismic data may be received, and, at each common-depth-point (CDP) location, inverse moveout performed on the stacked trace (at that location) to all locations within a user-defined aperture, i.e., an area within a user-specified distance. In various embodiments, the specified area may have different geometric shapes, e.g., circle, ellipse, square, hexagon, etc., although for programming convenience and ease, a square or box is preferably used. It should be noted that the term "common-depth-point" is often used in the art to denote "common midpoint" or CMP, which technically refers to a CDP where the subsurface is horizontal. As used herein, the terms CDP and CMP may be used interchangeably. This shortcut also provides sizable computational savings over the theoretical cost of a full 3-D prestack Delft computation.

Inverse moveout may be performed in any of a variety of ways. In a preferred embodiment, inverse moveout may comprise inverse normal moveout (inverse NMO), as is well known in the art, where each stacked trace is modified (compressed and stretched) and translated to offset locations around the stacked trace location using shifted stacking hyperbolas, i.e., using stacking velocities. Other, more sophisticated, and computationally intensive, inverse moveout techniques contemplated include using a reflector and velocity model to ray trace arrivals of reflectors for inverse moveout parameterization, among others. In an alternate embodiment, stacking velocity and reflector times may be used to synthesize a spike trace at the same location as the selected stack trace, and inverse moveout applied to the selected stack trace and the spike trace to generate respective inverse moveout corrected traces at the stack seismic trace location.

Then, each inverse moveout corrected trace is convolved. For example, in one embodiment, autoconvolution or retrocorrelation may be applied to the trace. In other words, the inverse moveout corrected trace may be convolved with itself. In an embodiment where a spike trace is synthesized and inverse moveout applied, the two inverse moveout corrected traces may be convolved with one another to generate a convolved trace.

The convolved traces are then summed at each CDP location. In the small aperture limit, 3-D prestack/poststack multiple prediction reduces to taking each stack trace and convolving it, either with itself or with a synthesized trace, in order to predict multiples. It is noted that autoconvolution of each stack trace is the classic 1966 approach of Anstey and Newman for 1-D prediction of multiples, and thus 3-D prestack/poststack multiple prediction may be considered to be an extension of their approach to 3-D. For further information regarding the approach of Anstey and Newman for 1-D prediction of multiples, please see "The Sectional Autocorrelogram and the Sectional Retrocorrelogram" by Anstey and Newman, Geophysical Prospecting, v. 14, pp. 389–426, which is hereby incorporated by reference in its entirety, as though fully and completely set forth herein.

In another approach, prestack predicted multiple gathers may be created, for example, by generating a predicted multiple trace for each source-receiver pair of interest in the prestack data geometry. In one embodiment, the predicted multiple trace for each source-receiver pair may be generated as follows:

The predicted multiple trace may be initialized, e.g., with zero values, and an aperture selected, typically containing a neighborhood around both the source and receiver locations. For example, in one embodiment, the aperture or neighborhood may be an ellipse with the source at one focus and the receiver at another, although other geometries are also contemplated.

For each location in that aperture, inverse moveout may be applied to a stack trace from the source location to that location, and to a stack trace from the receiver location to that location. The two inverse moved out traces may then be convolved together and summed into the predicted multiple trace. The generated predicted multiple traces together form or compose the prestack predicted multiple gathers.

In variants of the above approach, an inverse moved out spike trace may be used instead of the inverse moved out stack trace at the receiver or source location.

It should be noted that in various embodiments, the individual convolved traces may optionally be scaled and/or filtered before summing. Such "fold compensation", "rho-filter" and "obliquity" adjustments are well known to those skilled in the relevant art. In a preferred embodiment, for speed considerations, subsequent adaptive subtraction (or visual overlay) may be relied upon to accommodate distortions that may arise when the more expensive adjustments are not applied.

Thus, based on stacked seismic data, estimates may be computed of prestack data that would have been recorded at any desired source/receiver/azimuth/offset (distance).

The generated predicted multiples may then be used in a variety of ways. For example, in one embodiment, a seismic data set and predicted multiples may be received. The seismic data set may be any seismic data that has the same source/receiver geometry as the predicted multiples. Typically, the seismic data have been acquired over a formation of interest, and preferably comprise unmigrated seismic data. In one embodiment, the seismic data set may be the received stacked seismic data described above, i.e., the 3D stacked volume. In another embodiment, the seismic data set may be prestack seismic data, e.g., original seismic data from which the 3D stacked volume was generated. In yet another embodiment, the seismic data set may be DMO-corrected data.

A transform may optionally be applied to the seismic data set and predicted multiples, thereby generating a transformed seismic data set and transformed predicted multiples, where the transformed predicted multiples and the transformed seismic data set are in a format suitable for comparison. The transform, applied to both the seismic data set and the predicted multiples, may be any type of transform desired. For example, if the seismic data set is prestack data and the predicted multiples are predicted prestack traces, the transform may be a stacking process, resulting in stacked seismic data and stacked multiples. As another example, the transform may be a migration process, as is well known in the art. Thus, the transform may comprise any operation or process on the seismic data and multiples that produces a useful result, some examples of which are described below.

In one embodiment, the (optionally transformed) predicted multiples may be adaptively subtracted from the (optionally transformed) seismic data set, thereby generating a processed seismic data set, which may then be output. The processed seismic data set thus preferably comprises the original seismic data set with the multiples substantially removed or filtered out. Thus, the processed seismic data set may more clearly indicate characteristics of the formation or subsurface structure of interest.

In another embodiment, the (optionally transformed) predicted multiples may be overlaid on the (optionally transformed) seismic data set to generate a multiples template, which may then be output. As is well known in the art, the multiples template may be used in a variety of ways to assist analysis of the formation or subsurface structure of interest. For example, the multiples template may indicate which seismic features in the seismic data are likely due to multiple reflections and thereby not true primary reflections from the formation of interest.

Thus, various embodiments may use various sources and forms of seismic data and velocity information, including field data and models, to predict 3-D multiples. These predicted multiples may then be used to analyze or further process seismic data, e.g., to discover or characterize subsurface formations.

BRIEF DESCRIPTION OF THE DRAWINGS

A better understanding of the present invention can be obtained when the following detailed description of the preferred embodiment is considered in conjunction with the following drawings, in which:

FIG. 1B illustrates various examples of primary reflection raypaths;

DETAILED DESCRIPTION OF THE EMBODIMENTS

Incorporation by Reference

The Doctoral Thesis titled "3D Surface-Related Multiple Prediction" by Ewoud Jan van Dedem, ISBN 90-9015530-9, Copyright© 2002 by E. J. van Dedem, Delft University of Technology, Delft, The Netherlands, is hereby incorporated by reference in its entirety, as though fully and completely set forth herein.

"Practical aspects in the determination of 3-D stacking velocities" by Lehmann, H. J., and Houba, W., 1985, Geophysical Prospecting, v. 33, pp. 34–51 is hereby incorporated by reference in its entirety, as though fully and completely set forth herein.

"The Sectional Autocorrelogram and the Sectional Retrocorrelogram" by Anstey and Newman, 1966, Geophysical Prospecting, v. 14, pp. 389–426, is hereby incorporated by reference in its entirety, as though fully and completely set forth herein.

Figure 1A:
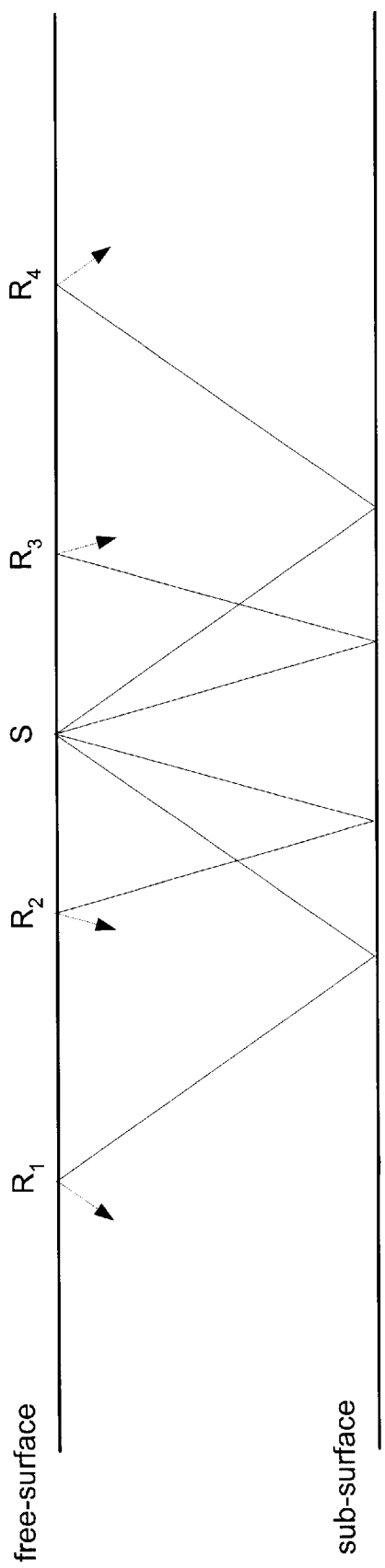
FIG. 1A illustrates a seismic source at the free surface with multiple receivers.
Figure 2A:
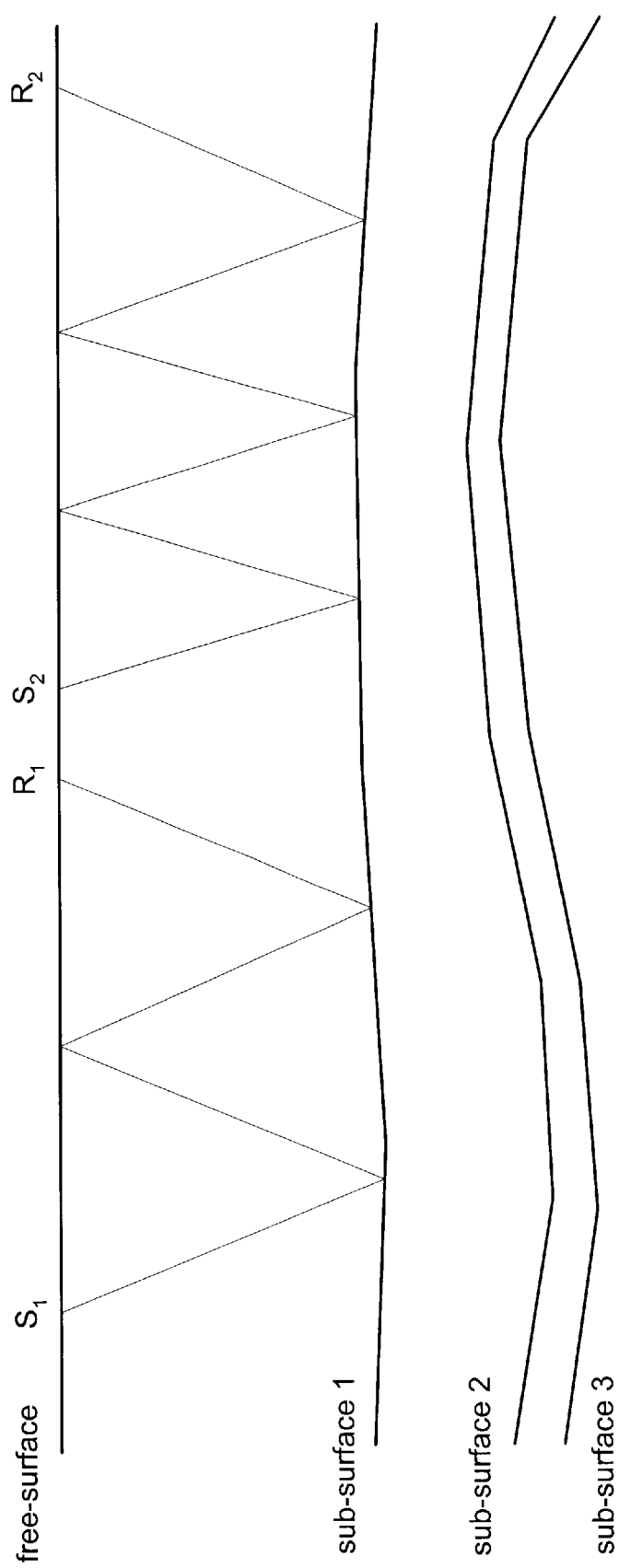
FIGS. 2A–2D illustrate various types of multiple reflection events.
Figure 2B:
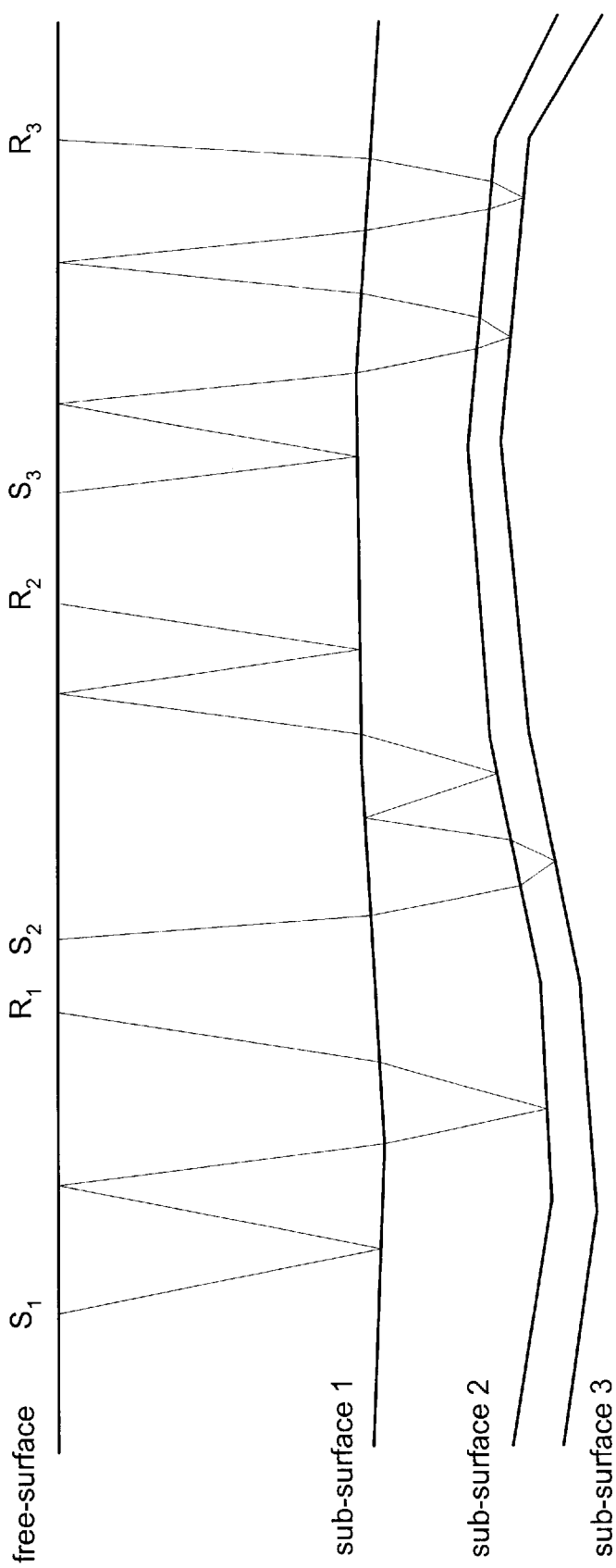
Figure 2C:
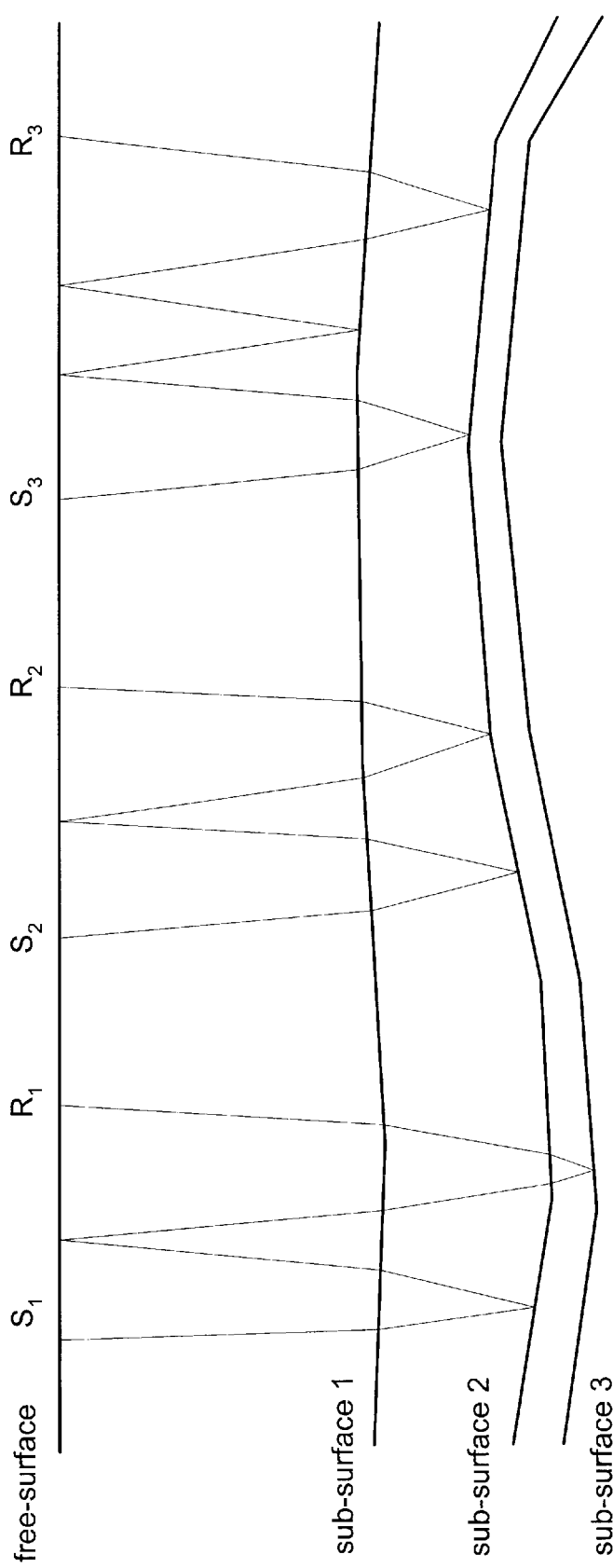
Figure 2D:
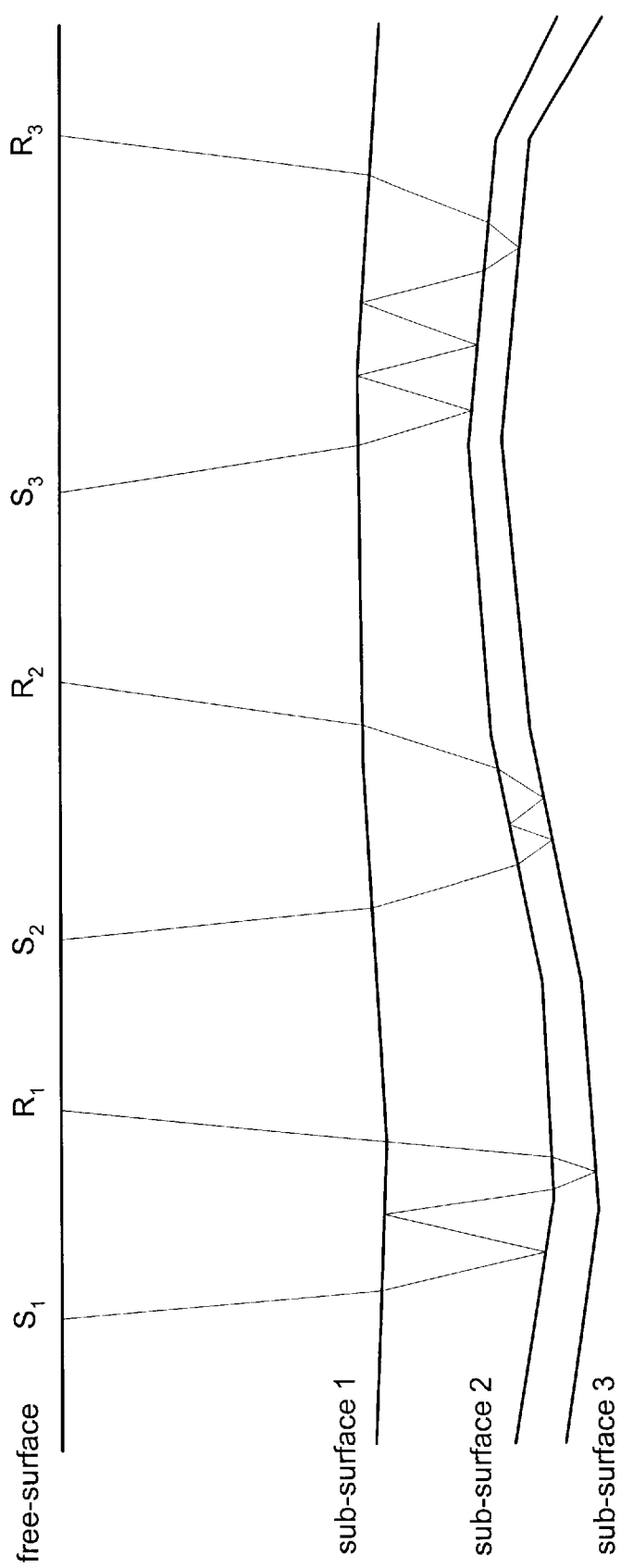
Figure 3:
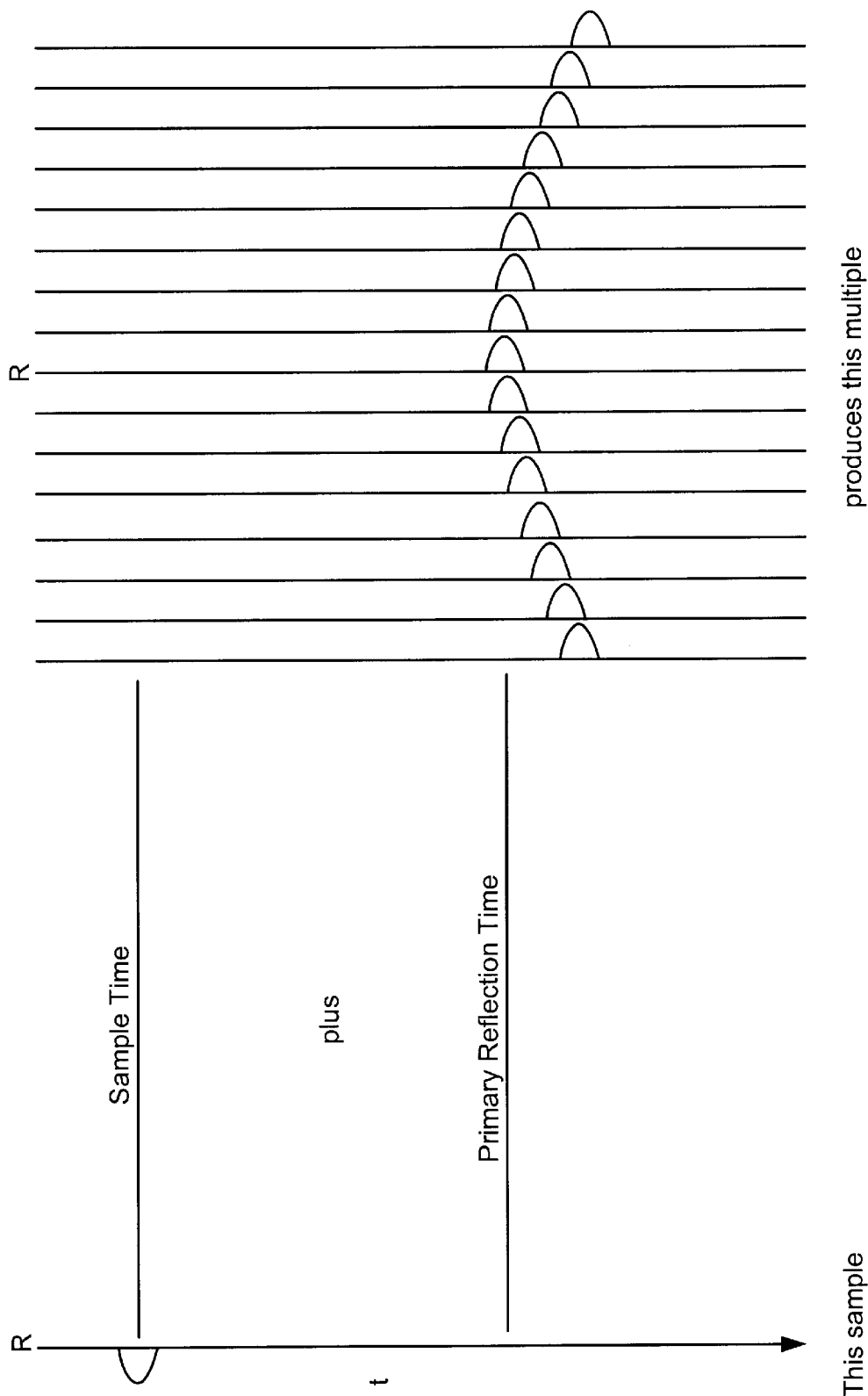
FIG. 3 illustrates the time relationship between a source sample and a corresponding primary reflection.
Figure 4:
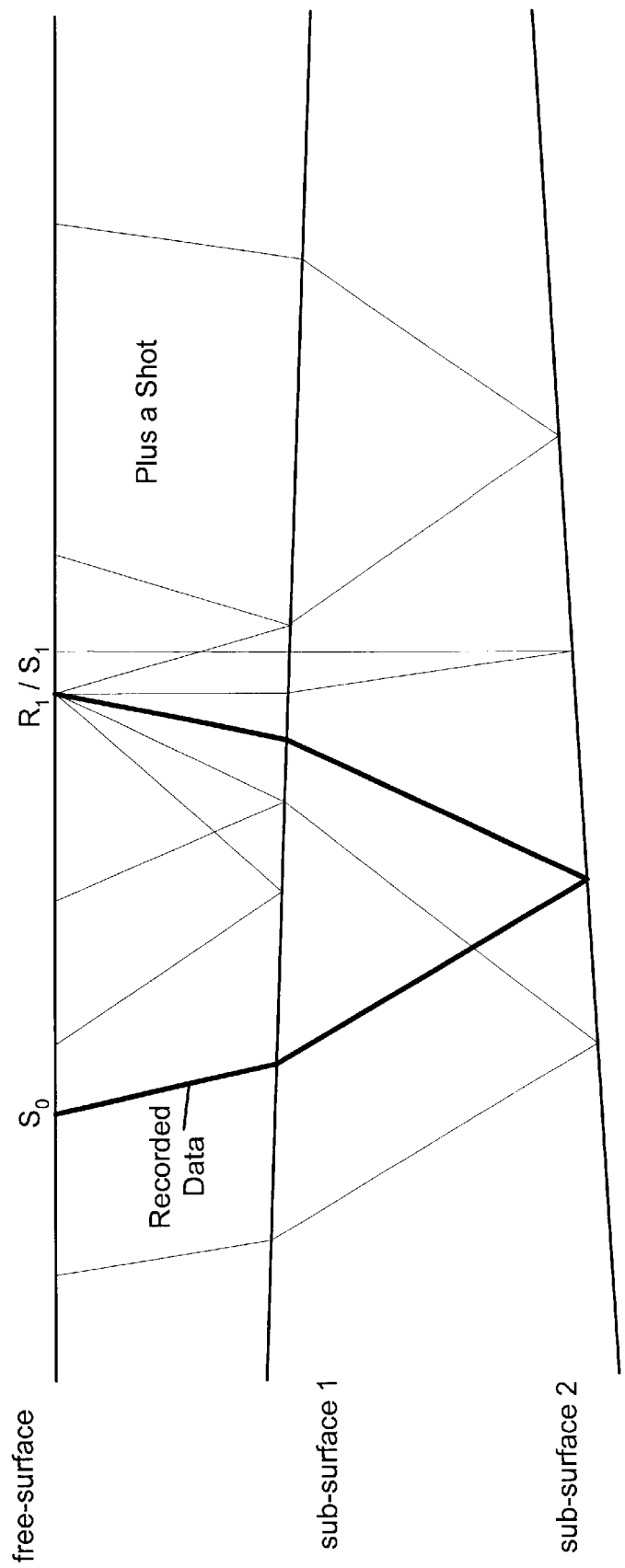
FIG. 4 illustrates example seismic signal raypaths with non-parallel subsurface layers.
Figure 5:
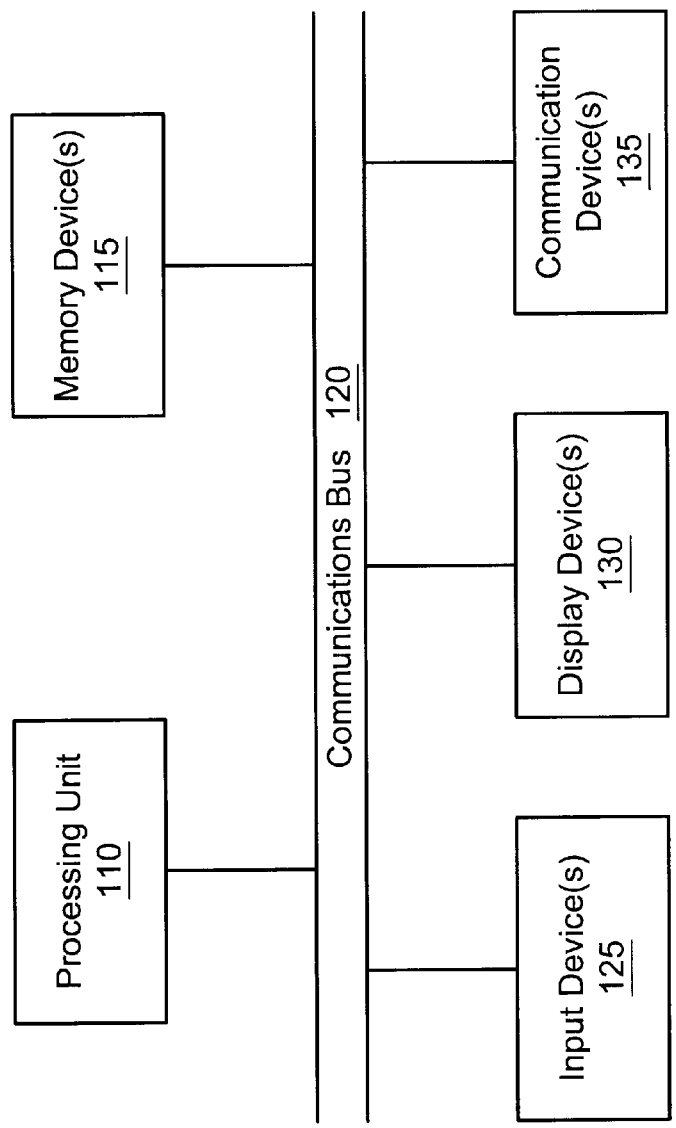
FIG. 5 illustrates an exemplary system suitable for implementing the present invention, according to one embodiment.

FIG. 5—System for Analyzing Seismic Data

FIG. 5 illustrates a system 100 for analyzing seismic data according to one set of embodiments of the invention. As FIG. 5 shows, the system 100 may include a processing unit 110, a collection of memory devices 115, a communication bus 120, a set of input devices 125, and one or more display devices 130. The collection of memory devices 115 may include any of various forms of memory media and memory access devices. For example, memory devices 115 may include semiconductor RAM and ROM devices as well as mass storage devices such as CD-ROM drives, magnetic disk drives, and magnetic tape drives, among others.

Processing unit 110 is preferably configured to read and execute program instructions, e.g., program instructions provided on a memory medium such as a set of one or more CD-ROMs, and loaded into semiconductor memory at execution time. Processing unit 110 may couple to memory devices 115 through communication bus 120 (or through a collection of busses). In response to the program instructions, the processing unit 110 may operate on seismic data stored in one or more of the memory devices 115. Processing unit 110 may include one or more programmable processors (e.g., microprocessors). In other embodiments, the processing unit 110 may include one or more programmable hardware devices, such as, for example, a field programmable gate array (FPGA).

One or more users may supply input to the system 100 through the set of input devices 125. Input devices 125 may include devices such as keyboards, mouse devices, digitizing pads, track balls, light pens, data gloves, eye orientation sensors, head orientation sensors, etc. The set of display devices 130 may include devices such as monitors, projectors, head-mounted displays, printers, plotters, etc.

In one embodiment, the system 100 may include one or more communication devices 135, e.g., a network interface card for interfacing with a computer network. For example, seismic data gathered at a remote site may be transmitted to the system 100 through a computer network. The system 100 may receive the seismic data from the computer network using the network interface card, and store the data for processing.

Adaptation of the Delft Approach to 3-D Stacked Data

The problems related to the application of demultiple algorithms to prestack 3-D data are analogous to those related to application of migration techniques to image 3-D data. For example, prestack 3-D images can be easily contaminated by edge effects and other coherent artifacts due to inadequate 3-D spatial coverage. Conversely, 3-D stacked data are a really dense, and so standard 3-D datasets typically have no problem supplying the dense, areal coverage requirements needed by 3-D poststack imaging algorithms. In other words, 3-D migration may be applied to the 3-D stack data volume instead of migrating the prestack data. Carrying the analogy further, it may be readily seen that the Delft surface-related multiple prediction approach is a form of 3-D prestack wave-equation modeling, whereby the input data act as a set of extended-waveform sources injected into the subsurface. Thus, since modeling and migration may in effect be considered to be two aspects of the same phenomenon, it is reasonable to consider an adaptation of the Delft technique to 3-D stacked data, i.e., whereby 3-D stacked data are used to predict multiples, as will be described below in detail.

Figure 6:
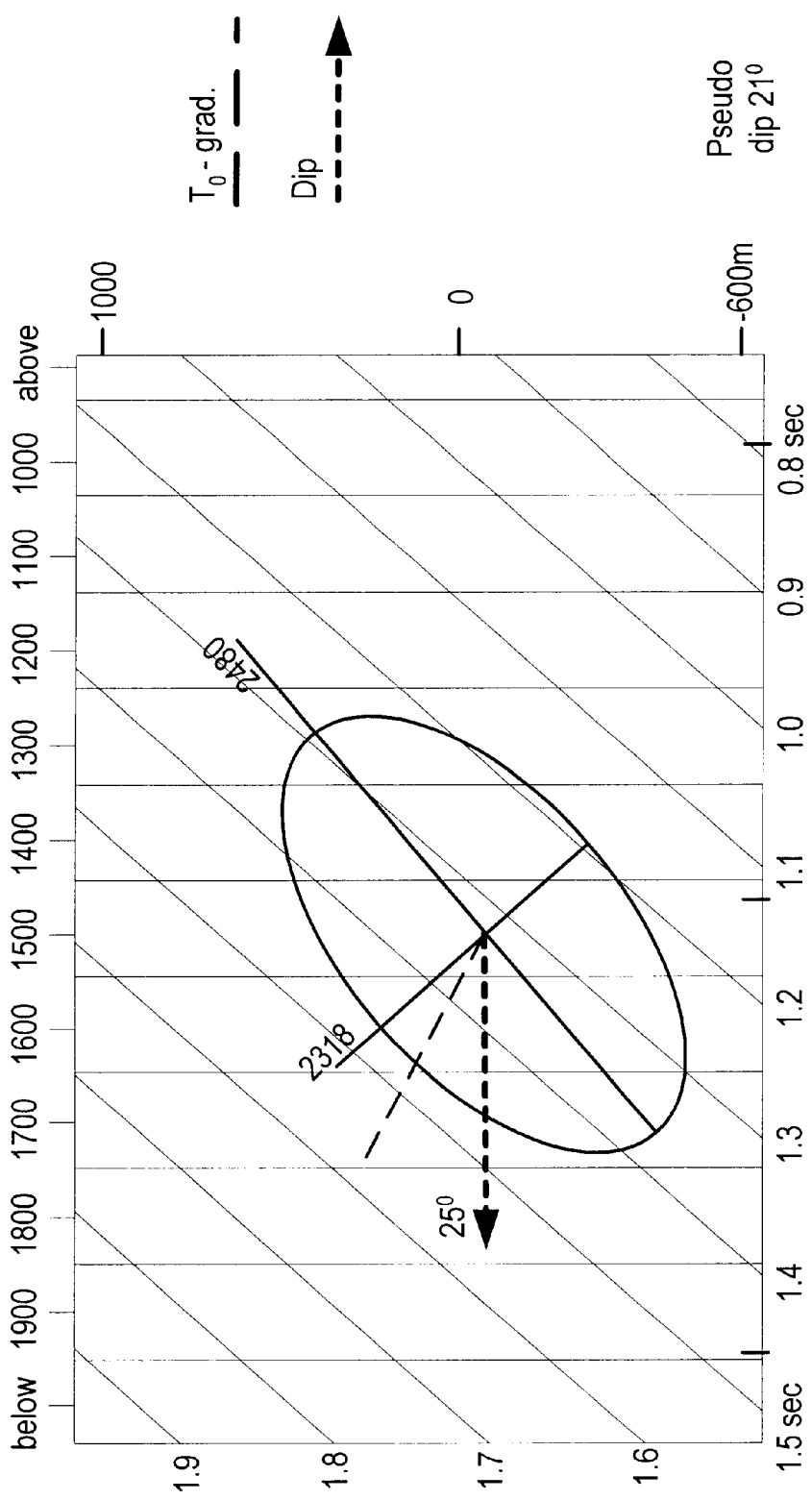
FIG. 6 illustrates hyperbolic fanout of stacking velocity, according to one embodiment.

FIG. 6 —Hyperbolic Fanout of Stacking Velocity

In one embodiment, a stacked 3-D input volume may be used to synthetically generate the dense, areal coverage required by the Delft method by means of inverse normal moveout (inverse NMO). The stacked 3-D input volume comprises a plurality of stacked traces. Each stacked trace corresponds to a plurality of prestack source and receiver location pairs. The prestack source and receiver location pairs may be associated with common depth point (CDP) traces which are used to create the stacked trace. However, it is noted that the prestack source and receiver pairs are not necessarily associated with CDP traces. As is known to those skilled in the art, each stacked trace is an approximately coherent sum of prestack data along hyperbolic paths, and so inverse moveout may generate reasonable approximations to the arrivals that would have been recorded with an ideal, dense, areal coverage. FIG. 6 is a schematic representation of a hyperbolic fanout of stacking velocity based on the well known relationship:

$$t^2 = t_0^2 + \frac{\|\vec{h}\|^2}{v_\phi^2} \tag{2}$$

where t is arrival time, $t_0$ is the shot time, $\vec{h}$ is a vector from the source to the receiver, and $v_\phi$ is the stacking velocity along the signal path. Thus this relationship characterizes stacking velocity at each common midpoint (CMP) or common-depth-point (CDP) as a function of azimuth (the source to receiver direction), where the ellipse shown in FIG. 6 is a 2-D cross-section of the stacking hyperboloid. Note that in 3-D, the stacking velocity hyperboloid is elliptically distorted, with perpendicular axes of minimum and maximum stacking velocity as indicated in FIG. 6. Note that the values of the minimum and maximum stacking velocities (2318 and 2480) are merely provided as examples, i.e., the actual values shown are not significant. As FIG. 6 also indicates, azimuthally-dependent velocity is preferably used in 3-D. Thus, based on the above relationship, if stacked data are available, a collection of 3-D CMP gathers may be generated by fanning out each stack trace in a stacking velocity hyperboloid, i.e., via inverse NMO. It is noted that shot records may be explicitly formed by resorting the CMP gathers back to shot records.

It should be noted that in an alternate approach, a more sophisticated model-based ray tracing technique may be used to predict detailed non-hyperbolic arrival paths. However, using inverse NMO to approximate arrival times may provide useful data, and at a much lower cost than the ray tracing technique.

The use of inverse moveout to generate prestack gathers has been used in the geophysics community for a long time, for example, to improve the inversion of poststack traces. For further information on hyperbolic fanout of stack velocities, please see "Practical aspects in the determination of 3-D stacking velocities" by Lehmann, H. J., and Houba, W., 1985, which was incorporated by reference above.

Figure 7:
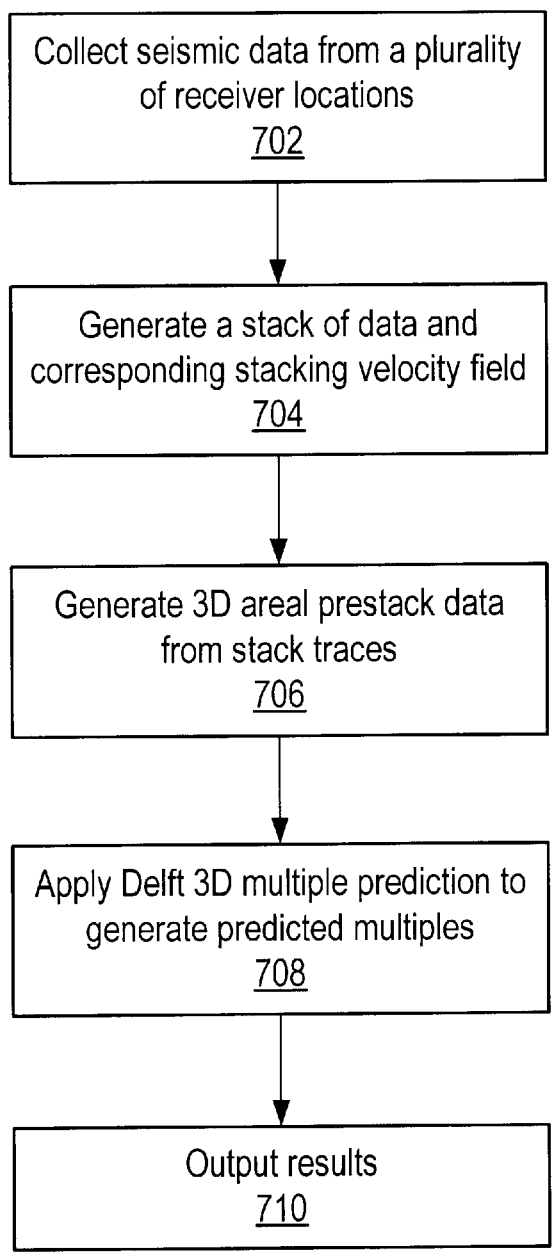
FIG. 7 is a high level flowchart of a method for predicting 3-D multiples, according to one embodiment.

FIG. 7—Method for Applying Delft Technique in 3-D

FIG. 7 is a high-level flowchart of one embodiment of a method for applying the Delft technique in 3-D. In various embodiments, some of the steps described may be performed concurrently, in a different order than shown, or omitted. Additional steps may also be performed as desired.

As FIG. 7 shows, in 702, seismic data may be collected from a plurality of receiver locations. The seismic data may be received directly from the receivers, e.g., via wired or wireless network, satellite, telephone, delivered storage medium, or any other means of transfer. Alternatively, the seismic data may be collected and sent to an intermediate system, e.g., an intermediate computer system, then received from the intermediate system, e.g., via a network, and stored on a storage medium, such as in the collection of memory devices 115 of system 100, described above.

Then, in 704, a stack of data, i.e., stacked seismic data, and a corresponding stacking velocity field may be generated. In other words, a plurality of stack traces may be collected and organized into a 3-D stacked volume, referred to as a "cube", as is well known in the art. Alternatively, the stacked data may be received from a third party, i.e., an intermediate system. In other words, the received seismic data may already be stacked.

In 706, 3-D areal prestack data may be generated from the stack traces. As noted above, in a preferred embodiment, prestack gathers may be generated from each stacked trace by inverse moveout according to an azimuthally-dependent stacking velocity field, e.g., using a hyperbolic fanout of the stacking velocities, ray tracing seismic signals with a velocity and reflector model, or any other means of performing inverse moveout of the stacked trace.

Then, as indicated in 708, Delft 3-D multiple prediction may be applied to the generated 3-D areal prestack data to generate predicted multiples, i.e., using the standard Delft approach in accordance with equation (1) above, as is well known in the art. It should be noted that this approach is not model-independent, as a velocity field is needed for the inverse moveout step.

Finally, as shown in 710, in one embodiment, the results of the above process, i.e., the predicted multiples, may be output. For example, the predicted multiples may be output to storage on the system 100, output to an external system, e.g., to another computer system over a network, or output to one or more of display devices 130, such as a computer monitor or printer.

The generated predicted multiples may then be used in a variety of ways. For example, as described below with reference to FIGS. 8A and 8B, the predicted multiples may be removed from the seismic data, e.g., by adaptive subtraction, or overlaid on the seismic data to generate a predicted multiples template, among other uses.

It should be noted that simply applying the Delft technique in 3-D may be computationally expensive. For example, in 2-D, the Delft computations can require days to complete on a single computer system, and may require hours to compute on a large PC cluster. The 3-D computations could easily be a million times more compute-intensive than the 2-D computations. Thus, a number of tradeoffs or compromises may be made to allow useful 3-D multiple predictions to be made in a small fraction of the time otherwise required.

For example, in one embodiment, each stacked trace may be fanned out only to a user-specified maximum offset. Said another way, the user may specify a maximum fanout distance from the location of each stacked trace, thereby specifying a neighborhood around the location to be used in the process. Since the computational cost is proportional to the square of this distance, significant time savings may be attained, just as in 3-D Kirchhoff migration.

Another compromise or shortcut that may be made to decrease the required computation for the multiple predictions is to compute only the zero-offset traces in the 3-D Delft multiple prediction step, instead of computing many offsets and azimuths and then stacking the resulting prestack multiple predictions. Computing only the zero-offset traces in the 3-D Delft multiple prediction step may substantially reduce the number of required computations.

It is noted that each of the above restrictions generally reduces one's ability to accurately predict some classes of free-surface multiples. However, the tradeoffs are justifiable when the key multiples of interest are surface peglegs or pure surface multiples generated from moderately-dipping subsurface reflectors. A high level flowchart of one embodiment of the method according to the present invention under these restrictions is described below with reference to FIG. 8.

Figure 8:
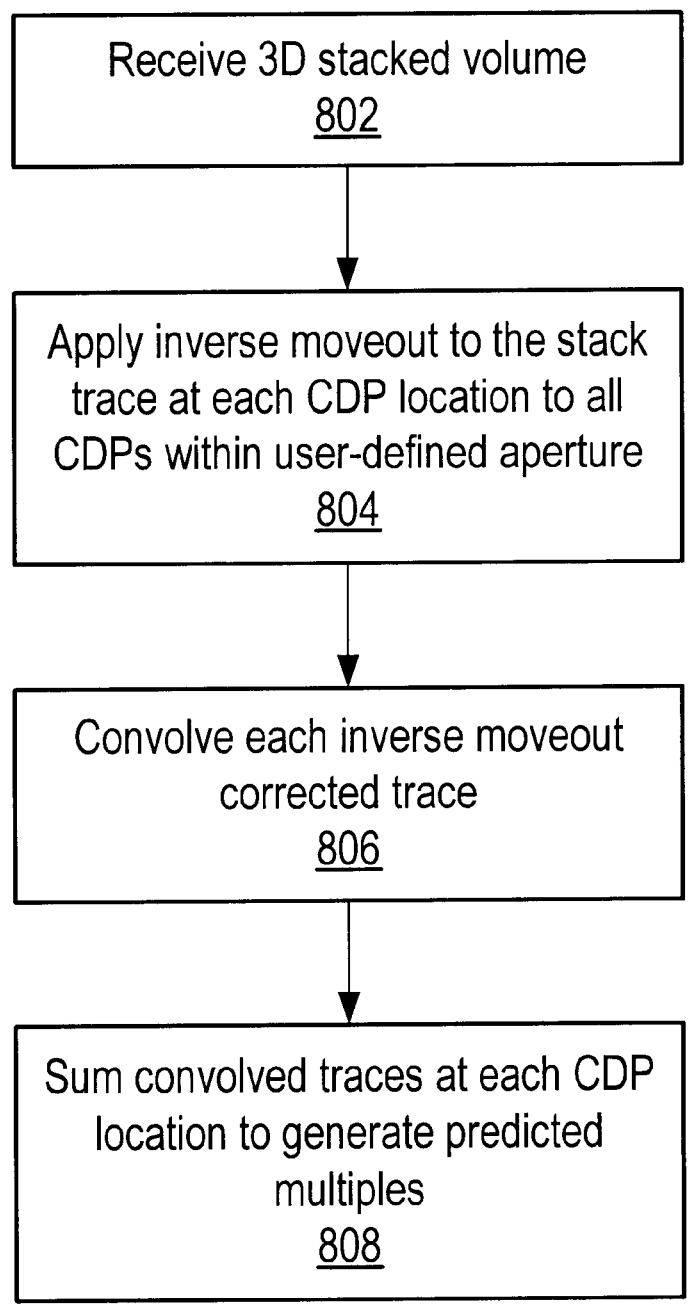
FIG. 8 is a high level flowchart of a method for predicting 3-D multiples with restrictions, according to on embodiment.

FIG. 8—High Level Flowchart of Restricted 3-D Multiple Prediction

FIG. 8 is a high level flowchart of one embodiment of a method for performing 3-D multiple prediction under the restrictions described above. As noted earlier, in various embodiments, some of the steps described may be performed concurrently, in a different order than shown, or omitted. Additional steps may also be performed as desired. Note that for brevity, where the method steps are substantially the same as those described above with reference to FIG. 7, the descriptions have been abbreviated.

As shown in FIG. 8, in 802, 3D stacked seismic data may be received. For example, as described above with reference to FIG. 7, prestack seismic data may have been collected from a plurality of receiver locations, and organized, i.e., stacked, into a 3-D stacked volume, optionally via an intermediate system, and then the resulting 3-D stacked seismic data received for use by the method.

In 804, at each common-depth-point (CDP) location, inverse moveout may be performed on the stacked trace to all CDPs within a user-defined aperture, i.e., an area within a user-specified distance. In various embodiments, the specified area may have different geometric shapes, e.g., circle, ellipse, square, hexagon, etc., although for programming convenience and ease, a square or rectangle is preferably used. It should be noted that the term "common-depth-point" is often used in the art to denote "common midpoint" or CMP, which technically refers to a CDP where the subsurface is horizontal. As used herein, the terms CDP and CMP may be used interchangeably. This shortcut also provides sizable computational savings over the theoretical cost of a full 3-D prestack Delft computation.

Inverse moveout may be performed in any of a variety of ways. In a preferred embodiment, inverse moveout may comprise inverse normal moveout (inverse NMO) where each stacked trace is modified (compressed and stretched) and translated to offset locations around the stacked trace location using shifted stacking hyperbolas, i.e., using stacking velocities. Other, more sophisticated and computationally intensive, inverse moveout techniques contemplated include using a reflector and velocity model to ray trace arrivals of reflectors for inverse moveout parameterization, among others. In an alternate embodiment, stacking velocity and reflector times may be used to synthesize a spike trace at the same location as the selected stack trace, and inverse moveout applied to the selected stack trace and the spike trace to generate respective inverse moveout corrected traces at the stack seismic trace location. In yet another embodiment, a reflector and velocity model may be used to ray trace arrivals of reflectors for inverse moveout parameterization, thereby generating corresponding inverse moveout corrected traces.

In 806, each inverse moveout corrected trace is convolved. For example, in one embodiment, autoconvolution or retro-correlation may be applied to the trace. In other words, the inverse moveout corrected trace may be convolved with itself. In an embodiment where a spike trace is synthesized and inverse moveout applied, the two inverse moveout corrected traces may be convolved with one another to generate a convolved trace.

In 808, the convolved traces are summed at each CDP location. In the small aperture limit, 3-D prestack/poststack multiple prediction reduces to taking each stack trace and convolving it, either with itself or with a synthesized trace, in order to predict multiples. It is noted that autoconvolution of each stack trace is the classic 1966 approach of Anstey and Newman for 1-D prediction of multiples, and thus, 3-D prestack/poststack multiple prediction may be considered to be an extension of their approach to 3-D. For further information regarding the approach of Anstey and Newman for 1-D prediction of multiples, please see "The Sectional Autocorrelogram and the Sectional Retrocorrelogram" by Anstey and Newman, Geophysical Prospecting, v. 14, pp. 389–426, which was incorporated by reference above.

Further detailed embodiments of the method of FIG. 8 (under the restrictions mentioned above) are described below with reference to FIGS. 9A–9I.

In another approach, prestack predicted multiple gathers may be generated, for example, by generating a predicted multiple trace for each source-receiver pair in a prestack data geometry of interest. In one embodiment, the predicted multiple trace for each source-receiver pair may be generated as follows:

The predicted multiple trace may be initialized, e.g., with zero values, and an aperture selected, typically containing a neighborhood around both the source and receiver locations. For example, in one embodiment, the aperture or neighborhood may be an ellipse with the source at one focus and the receiver at another, although other geometries are also contemplated.

For each location in that aperture, inverse moveout may be applied to a stack trace from the source location to that location, and to a stack trace from the receiver location to that location. The two inverse moved out traces may then be convolved together and summed into the predicted multiple trace. The generated predicted multiple traces together form or compose the prestack predicted multiple gathers.

In a variant of the above approach, an inverse moved out spike trace may be used instead of the inverse moved out stack trace at the receiver location. In another embodiment, the source and receiver may interchange roles. Detailed embodiments of these predicted multiple gather approaches are described below with reference to FIGS. 9D–9I.

Thus, based on stacked seismic data, estimates may be computed of prestack data that would have been recorded at any desired source/receiver/azimuth/offset (distance). Various alternate embodiments are described below with reference to FIGS. 9A–9I.

Figure 8A:
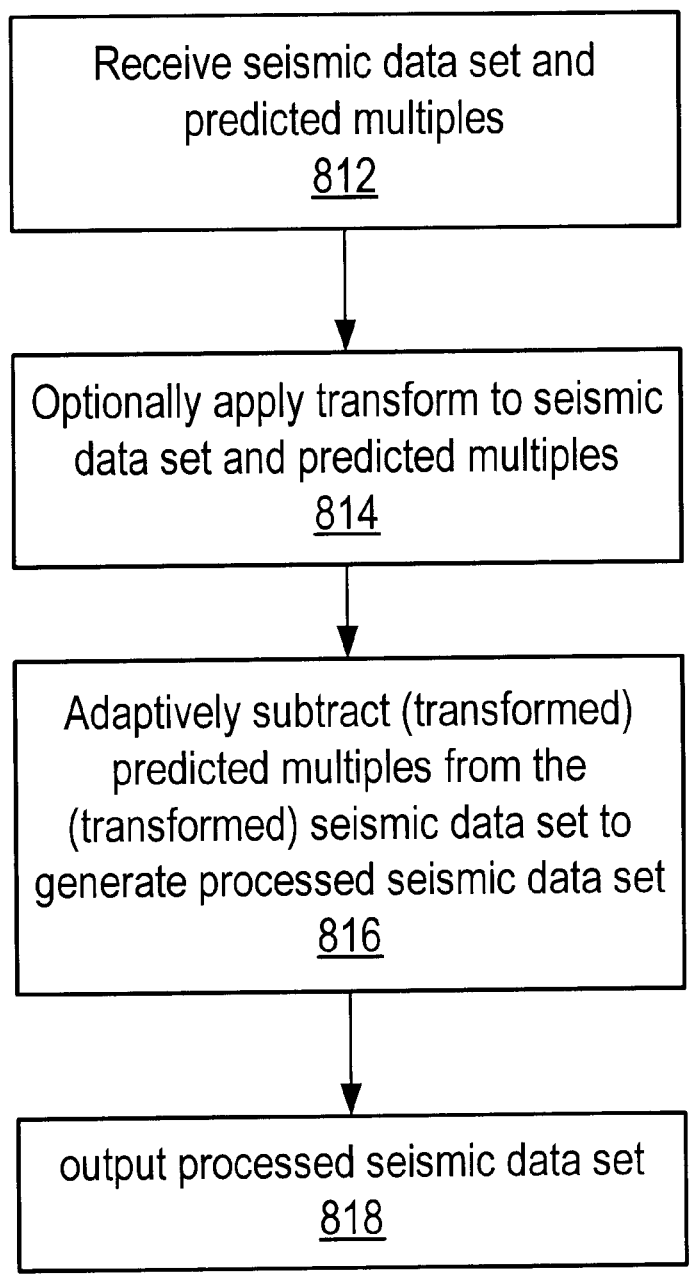
FIGS. 8A and 8B illustrate various methods of use of the predicted multiples from the method of FIG. 8.
Figure 8B:
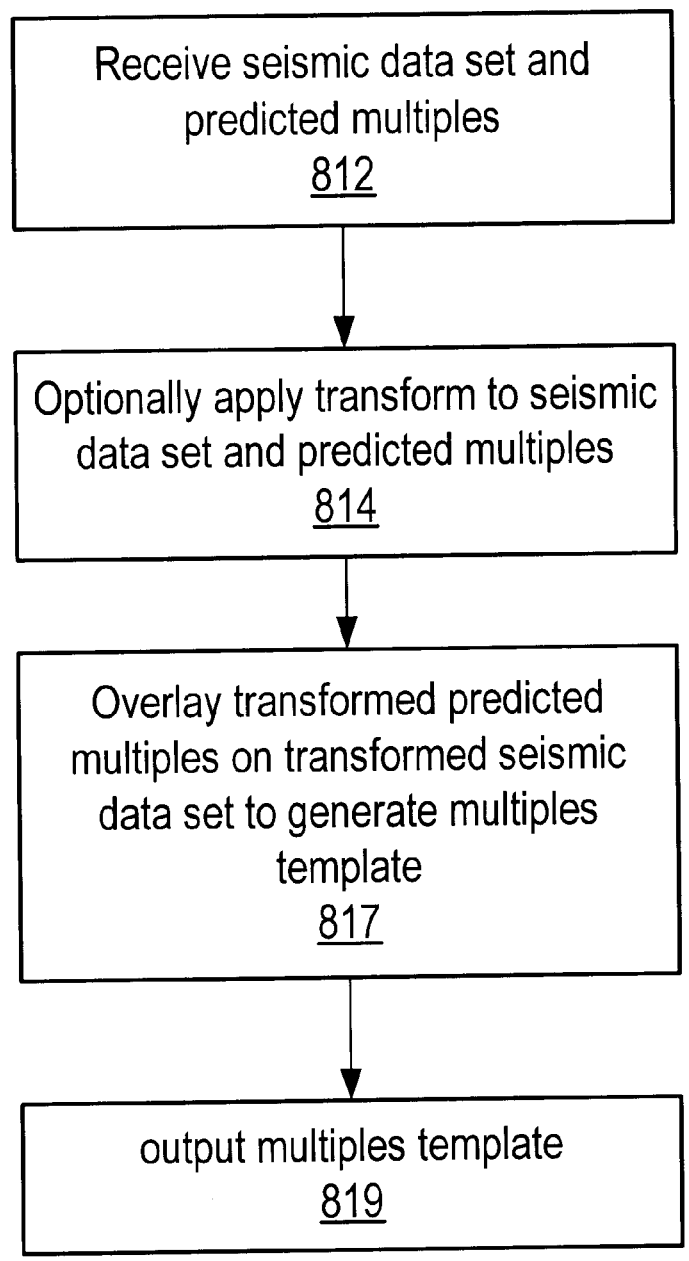

FIGS. 8A and 8B—Uses of Predicted Multiples

FIGS. 8A and 8B illustrate various methods of use of the predicted multiples from the method of FIG. 8. It is noted that the methods of FIGS. 8A and 8B are meant to be exemplary, and are not intended to limit the use of the predicted multiples to any particular approach, application, or domain.

As FIG. 8A shows, in 812, a seismic data set and predicted multiples may be received. For example, the predicted multiples are preferably generated by an embodiment of the method of FIG. 8. The seismic data set may be any seismic data that has the same source/receiver geometry as the original geometry for which the multiples were predicted. Typically, the seismic data have been acquired over a formation of interest, and preferably comprise unmigrated seismic data. In one embodiment, the seismic data set may be the stacked seismic data of FIG. 8 above, i.e., the 3D stacked volume. In another embodiment, the seismic data set may be prestack seismic data, e.g., original seismic data from which the 3D stacked volume was generated. In yet another embodiment, the seismic data set may be DMO corrected data, described in more detail below.

In 814, a transform may optionally be applied to the seismic data set and predicted multiples, thereby generating a transformed seismic data set and transformed predicted multiples, where the transformed predicted multiples and the transformed seismic data set are in a format suitable for comparison. The transform, applied to both the seismic data set and the predicted multiples, may be any type of transform desired. For example, if the seismic data set is prestack data and the predicted multiples are predicted prestack traces, the transform may be a stacking process, resulting in stacked seismic data and stacked multiples. As another example, the transform may be a migration process, as is well known in the art. Thus, the transform may comprise any operation or process on the seismic data and multiples that produces a useful result, some examples of which are described below.

In 816, the (optionally transformed) predicted multiples may be adaptively subtracted from the (optionally transformed) seismic data set, thereby generating a processed seismic data set, which may then be output, as indicated in 818. The processed seismic data set thus preferably comprises the original seismic data set with the multiples substantially removed or filtered out. Thus, the processed seismic data set may more clearly indicate characteristics of the formation or subsurface structure of interest.

FIG. 8B illustrates another exemplary use of the predicted multiples of FIG. 8. As FIG. 8B shows, once the seismic data set and the predicted multiples have been received (812) and optionally transformed (814), then in 817, the (optionally transformed) predicted multiples may be overlaid on the (optionally transformed) seismic data set to generate a multiples template, which may then be output, as indicated in 819. As is well known in the art, the multiples template may be used in a variety of ways to analyze the formation or subsurface structure of interest. For example, the multiples template may indicate which seismic features in the seismic data are likely due to multiple reflections and which are likely due to primary reflections from the formation of interest.

Common Data Transformations and Operations for Predicted Multiples

The following are exemplary transformations and operations contemplated for use with predicted multiples and corresponding acquired seismic data, although it is noted that the transformations and operations described are meant as examples only, and are not intended to limit the transformation and operations to any particular form or functionality. Note that in various of the transforms and operations described below, the acquired seismic data may be prestack seismic data, or may be poststack seismic data.

1) Stack the prestack seismic data and the predicted multiple gathers, and adaptively subtract the latter (stacked predicted multiple gathers) from the former (stacked seismic data).
2) Post-stack migrate the poststack seismic data and the zero-offset (stack) predicted multiples, and adaptively subtract the latter from the former.
3) Post-stack migrate the poststack seismic data and the zero-offset (stack) predicted multiples, and overlay the latter on the former to generate a predicted multiples interpretation template.
4) Stack the prestack seismic data and the predicted multiple gathers, then post-stack migrate the resulting stacked seismic data and the stacked predicted multiple gathers, and adaptively subtract the latter from the former.
5) Stack the prestack seismic data and the predicted multiple gathers, then post-stack migrate the resulting stacked seismic data and the stacked predicted multiple gathers, and overlay the latter on the former to generate a predicted multiples interpretation template.
6) Prestack migrate the prestack seismic data and the predicted multiple gathers, and adaptively subtract the latter from the former.
7) Prestack migrate the prestack seismic data and the predicted multiple gathers, then overlaying the latter on the former to generate a predicted multiples interpretation template.

Thus, predicted multiples generated from stacked seismic data may be used in a number of ways to analyze or further process seismic data associated with a subsurface formation of interest.

FIGS. 9A–9I—Restricted 3-D Delft Multiple Prediction Embodiments

FIGS. 9A–9I flowchart various embodiments of a method for performing 3-D Delft multiple prediction under the restrictions described above. As noted earlier, in various embodiments, some of the steps described may be performed concurrently, in a different order than shown, or omitted. Additional steps may also be performed as desired. Note that for brevity, where the method steps are substantially the same in the following methods, the subsequent descriptions have been abbreviated or omitted.

It should be noted that in the methods of FIGS. 9A–9I, the predicted multiples are removed, i.e., adaptively subtracted, from the seismic data. However, as noted above, in other embodiments, the predicted multiples may instead be overlaid on the seismic data to form a predicted multiple template, which, as is well known in the art, is a powerful tool for analyzing or characterizing subsurface formations. Thus, although not specifically shown, variants of the methods of FIGS. 9A–9I where the predicted multiples are used to generate predicted multiples templates are also contemplated.

Figure 9A:
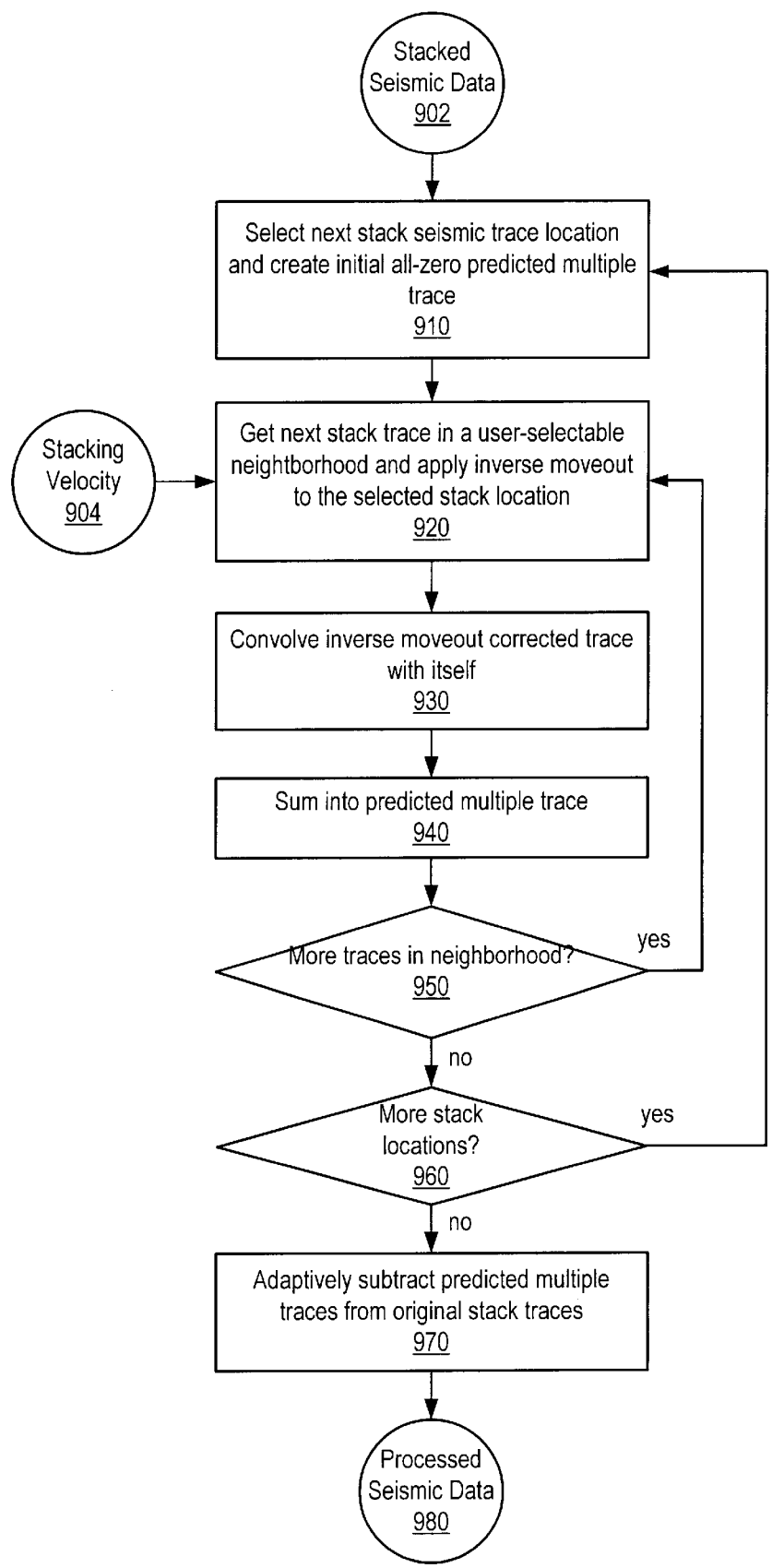
FIGS. 9A–9I flowchart various detailed embodiments of methods for restricted 3-D multiple prediction.

FIG. 9A flowcharts a preferred embodiment, where stacked seismic data and determined or modeled stacking velocities are used to predict and remove multiples from the 3-D seismic data.

As shown in FIG. 9A, stacked seismic data 902 may be received, as described above in 802 of FIG. 8. As also described above, the stacked seismic data 902 preferably comprises a plurality of stack seismic traces. Each of the stack seismic traces is associated with a respective stack seismic trace location.

In 910, a next stack seismic trace location may be selected and an initial all-zero predicted multiple trace created. In one embodiment, the initial all-zero predicted multiple trace may be a data structure initialized with zero values which, by the process described below, may be iteratively populated with values to generate a resulting predicted multiple trace.

In 920, a next stack trace in a user-selectable neighborhood may be retrieved, and inverse moveout performed on the stack trace to the selected stack seismic trace location of 910, thereby generating an inverse moveout corrected trace at the stack seismic trace location. Note that in this embodiment, stacking velocity 904 is utilized in the inverse moveout, e.g., to perform inverse normal moveout of the stack trace. As is well known to those skilled in the art, the stacking velocity may be calculated from normal-moveout measurements, and is commonly used to maximize events in common-depth-point stacking.

In 930, the inverse moveout corrected trace of 920 is convolved with itself. In other words, the trace may be autoconvolved, thereby generating an autoconvolved trace, as is well known in the art.

Once the trace has been autoconvolved, the autoconvolved trace may be summed into the predicted multiple trace, as indicated in 940.

Then, as shown in 950, a determination may be made as to whether there are more traces in the user-specified neighborhood. If there are further traces in the neighborhood to be processed, then the method may return to 920, and proceed as described above. If there are no more traces in the neighborhood to process, then the method may continue to 960, as shown.

In 960, a determination may be made as to whether there are more stack seismic trace locations to process. If there are more stack seismic trace locations to process, then the method may return to 910 as shown, and may proceed as described above, selecting the next stack seismic trace location and proceeding as described.

If in 960 there are no more stack seismic trace locations to process, then in 970, the predicted multiple traces may optionally be adaptively subtracted from the original stack traces, said adaptive subtraction being well known in the art.

Adaptively subtracting or removing the predicted multiple traces from the original stack traces may thus generate processed seismic data 980, as shown, that may then be used to analyze or characterize subsurface formations as desired. More specifically, removal of the predicted multiples may clarify the nature of primary seismic events, removing noise and other obscuring signals that make the analysis more difficult. Thus, the method of FIG. 9A predicts a zero-offset trace at each stack seismic trace location.

Although the method described above with reference to FIG. 9A is a preferred embodiment, there are a number of practicable variations on the technique that may also be used to predict and remove or subtract multiples from seismic data. A representative set of these embodiments is described below with reference to FIGS. 9B–9I. It is noted that in other embodiments, various portions of the different methods described below may be combined with each other to compute and optionally remove predicted multiples. Note that for brevity, where the method steps are substantially the same as in previously described embodiments, the descriptions may be abbreviated or omitted.

As is well known in the art, if a spike appears at an arrival time $T_0$ of some primary reflection, then convolving the spike trace with a stack trace having a primary at arrival time $T_1$ will shift the stack trace primary to the sum of the two times, i.e., $T_0+T_1$. This delayed time is approximately where a multiple would appear in a simple 1-D, i.e. horizontally stratified, medium with source and receiver at the stack trace location. The basis of this example is the relationship of equation (1), where the down-going source plus the reflected data convolved (appropriately) with the sought-after subsurface response is the upcoming recorded data, as noted above. The multiples are the reflected data convolved with the sought-after subsurface response. The sought-after subsurface response is the result of the same seismic acquisition example, but run over an earth without the free surface and with a source waveform that is purely a spike. A significant portion of the energy in that sought-after subsurface response is due to primary reflections. Hence aligning spike (s) with one or more stacked trace primary reflection events may allow faithful prediction of a significant subset of the multiples in the data.

Figure 9B:
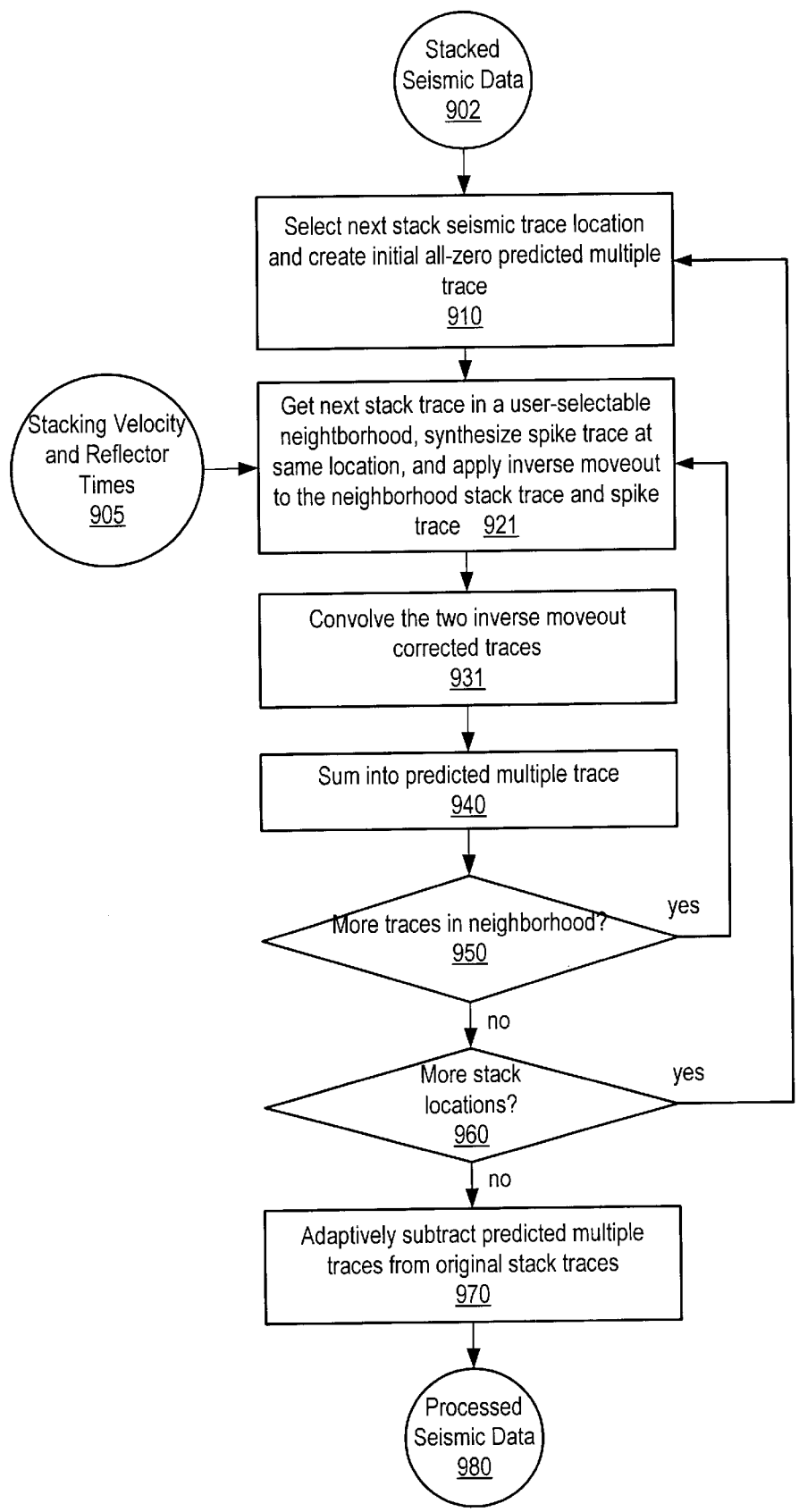

In the embodiment shown in FIG. 9B, rather than using just the stacking velocity 904 to apply inverse moveout of the neighborhood stack traces to the selected stack seismic trace location as indicated in 920 of FIG. 9A, in 921 of FIG. 9B, stacking velocity and reflector times 905 may be used to synthesize a spike trace at the location of the neighborhood stack trace, i.e., at the location in the specified neighborhood, and inverse moveout applied to the neighborhood stack trace and the spike trace to generate respective inverse moveout corrected traces at the selected stack seismic trace location. Then, in 931, the two inverse moveout corrected traces may be convolved with one another to generate a convolved trace.

Said another way, inverse moveout may be applied to the neighborhood stack trace and the spike trace, thereby generating an inverse moveout corrected trace at the selected stack seismic trace location and an inverse moveout corrected spike trace at the selected stack seismic trace location. The inverse moveout corrected trace and the inverse moveout corrected spike trace may then be convolved with each other to generate the convolved trace.

The method may then proceed as described above, summing the convolved trace into the predicted multiple trace in 940, and so on, as in the method of FIG. 9A.

Figure 9C:
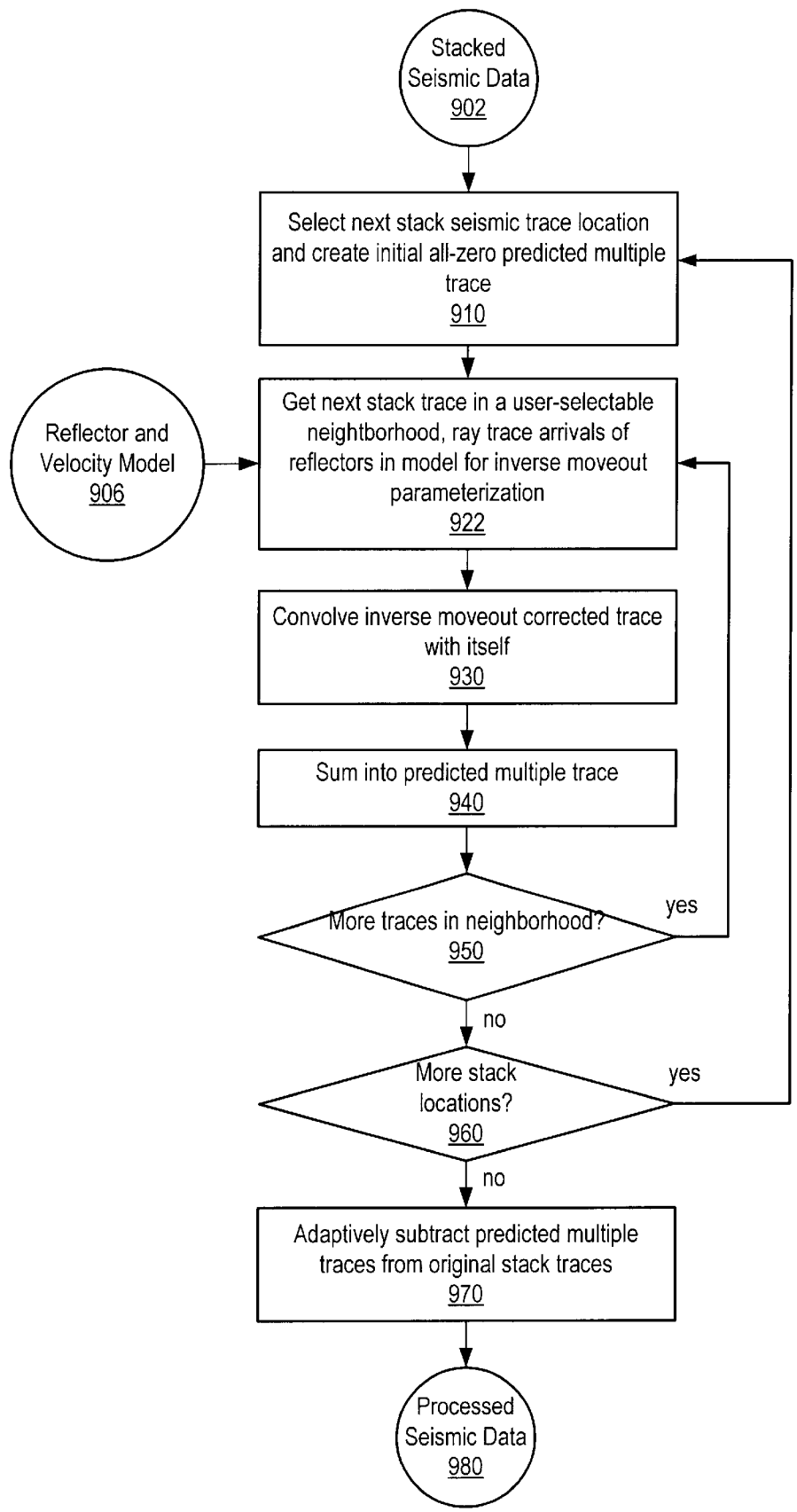

In an alternate embodiment, shown in FIG. 9C, rather than using the stacking velocity 904 to perform inverse moveout of each (neighborhood) stack trace to the selected stack seismic trace location as indicated in 920 of FIG. 9A, in 922, a reflector and velocity model 906 may be used to ray trace arrivals of reflectors for inverse moveout parameterization, thereby generating corresponding inverse moveout corrected traces at the selected stack seismic trace location. In other words, rather than using measured or computed stacking velocity and reflector data to perform the inverse move out , a computer model of the stacking velocity and reflectors may be used to compute arrivals via ray tracing, thereby generating an inverse moveout corrected trace at the selected stack seismic trace location, which may then be convolved with itself in 930, and the resulting autoconvolved trace summed into the predicted multiple trace in 940, as described above.

Figure 9D:
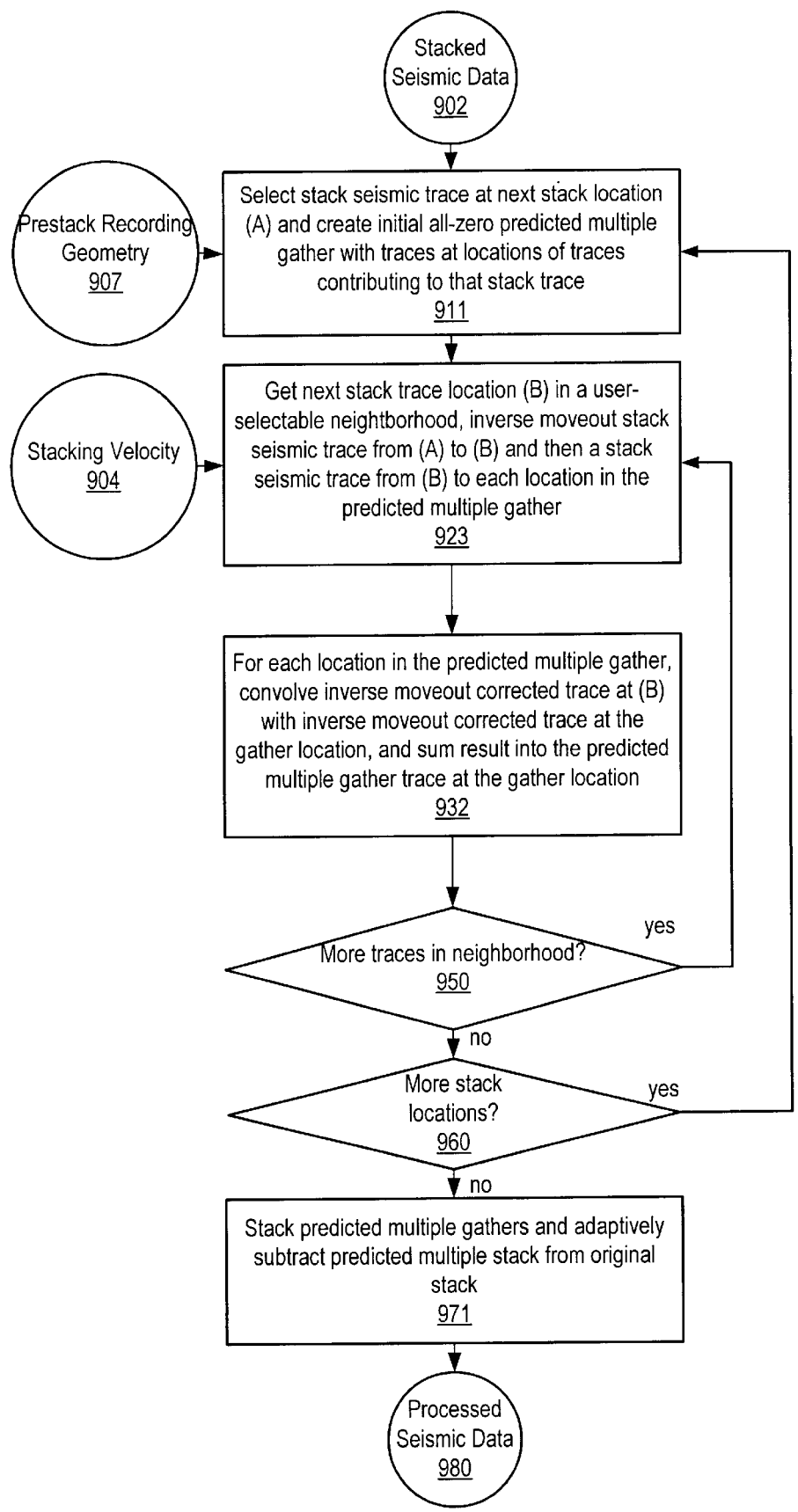

In another embodiment, shown in FIG. 9D, rather than selecting a next stack seismic trace location and creating an initial all-zero predicted zero-offset multiple trace, as described above in 910, a stack seismic trace at stack seismic trace location A may be selected, and prestack recording geometry 907 may be utilized to create an initial all-zero predicted multiple gather with traces at locations of traces contributing to that stack seismic trace, as indicated in 911 of FIG. 9D.

Then, in 923, a next stack trace location B in a user-selectable neighborhood (of location A) may be selected, and using stacking velocity 904, inverse moveout may be performed on the stack seismic trace from location A to location B, then inverse moveout applied to a stack seismic trace at B to each location in the predicted multiple gather, thereby generating an inverse moveout corrected trace at location B, and an inverse moveout corrected trace at each location in the predicted multiple gather.

In 932, for each location in the predicted multiple gather: (1) the inverse moveout corrected trace at B may be convolved with the inverse moveout corrected trace at the location in the predicted multiple gather, and (2) the result summed into the predicted multiple gather trace at the predicted multiple gather location.

When there are no more traces in the neighborhood (950) and no more stack seismic trace locations to process (960), then in 971, the predicted multiple gathers may be stacked and adaptively subtracted from the original stack, as shown, thereby generating the processed seismic data 980.

Thus, the embodiment of FIG. 9D predicts nonzero-offset traces at each stack seismic location A, i.e., for the source-receiver combinations that went into the stacked trace at location A, then stacks the predicted multiples to produce a more sophisticated estimate (compared to the method of FIG. 9A) of what constitutes multiples on the original stack trace at A. It is noted that the method of FIG. 9D is conceptually similar to that of FIG. 9A, but is more computationally expensive and somewhat more accurate, as it models the effect of stacking on the predicted prestack multiples. It is noted that a zero-offset prediction may be significantly less accurate in some structurally complex settings.

Figure 9E:
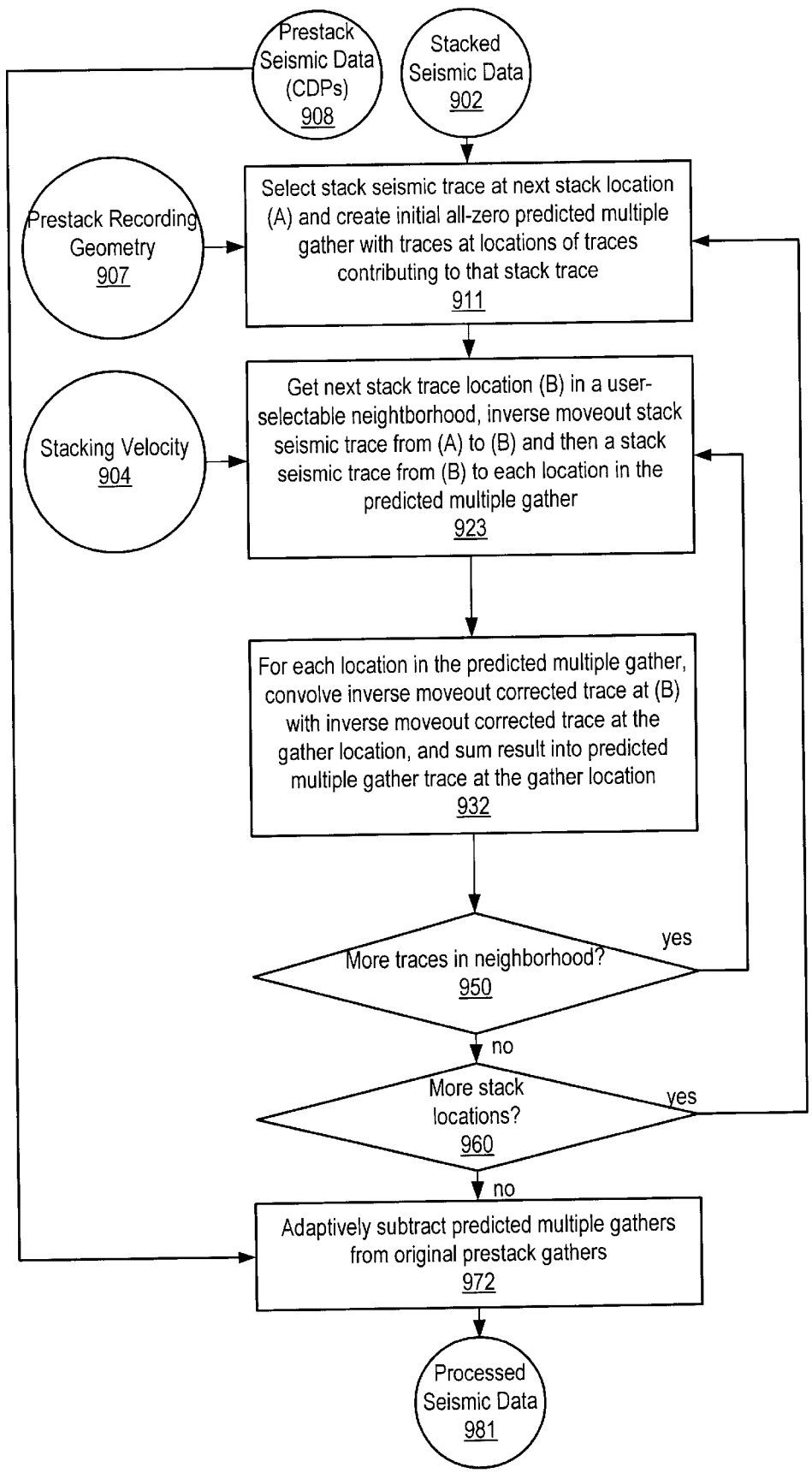

FIG. 9E illustrates an embodiment of the method of FIG. 9D, where, rather than stacking predicted multiple gathers and adaptively subtracting the predicted multiple stack from the original stacked data in 971, in 972, the predicted multiple gathers may be adaptively subtracted from prestack seismic data 908, i.e., from original prestack gathers, thereby generating processed seismic data 981, as shown. In other words, in this embodiment, the stacked seismic data 902 are used (in conjunction with prestack recording geometry 907 and stacking velocity 904) to predict the multiple gathers as described above with reference to FIG. 9D, but then the predicted multiple gathers are adaptively subtracted from prestack data 908, as opposed to subtracting the stack of the predicted gathers from the stacked seismic data 902.

Figure 9F:
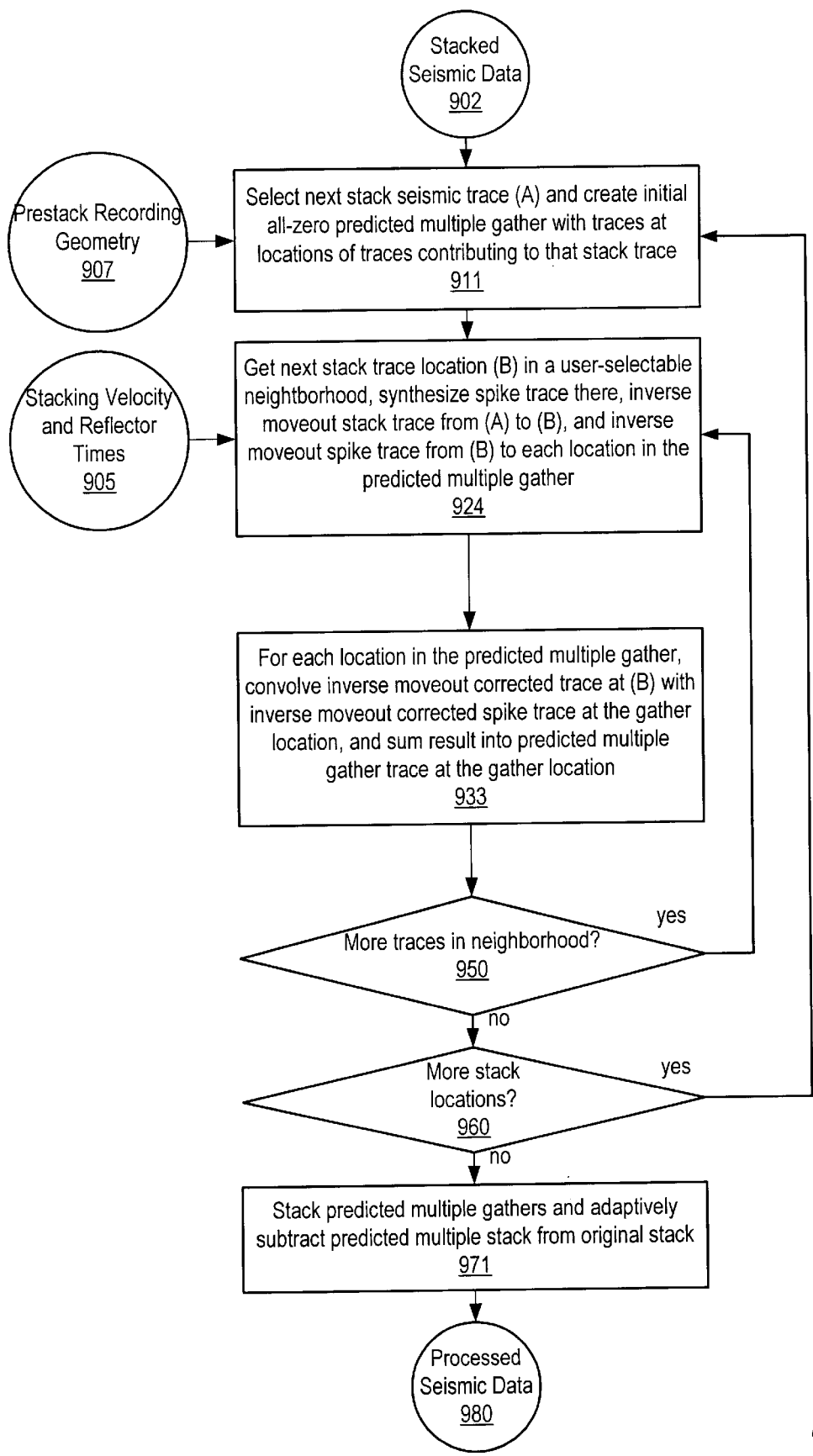

In another embodiment, shown in FIG. 9F, a stacked seismic trace at a next stack trace location A may be selected, and prestack recording geometry 907 utilized to create an initial all-zero predicted multiple gather with traces at locations of traces contributing to that stack seismic trace, as indicated in 911 and described above with reference to FIG. 9D.

Then, in 924, a next stack trace location B in a user-selectable neighborhood may be selected, and stacking velocity and reflector times 905 used to synthesize a spike trace, i.e., synthesized stacked data generated by analysis of the original stacked seismic data 902, at B. Inverse moveout may then be applied to the stack seismic trace from A to location B, and applied to the spike trace from B to each location in the predicted multiple gather, thereby generating an inverse moveout corrected trace at the stack trace location B, and an inverse moveout corrected spike trace at each location in the predicted multiple gather.

In 933, for each location in the predicted multiple gather: (1) the inverse moveout corrected trace at B may be convolved with the inverse moveout corrected spike trace at the location in the predicted multiple gather, and (2) the result summed into predicted multiple gather trace at the predicted multiple gather location.

When there are no more traces in the neighborhood (950) and no more stack seismic trace locations to process (960), then in 971, the predicted multiple gathers may be stacked and adaptively subtracted from the original stack, as shown, thereby generating the processed seismic data 980.

Figure 9G:
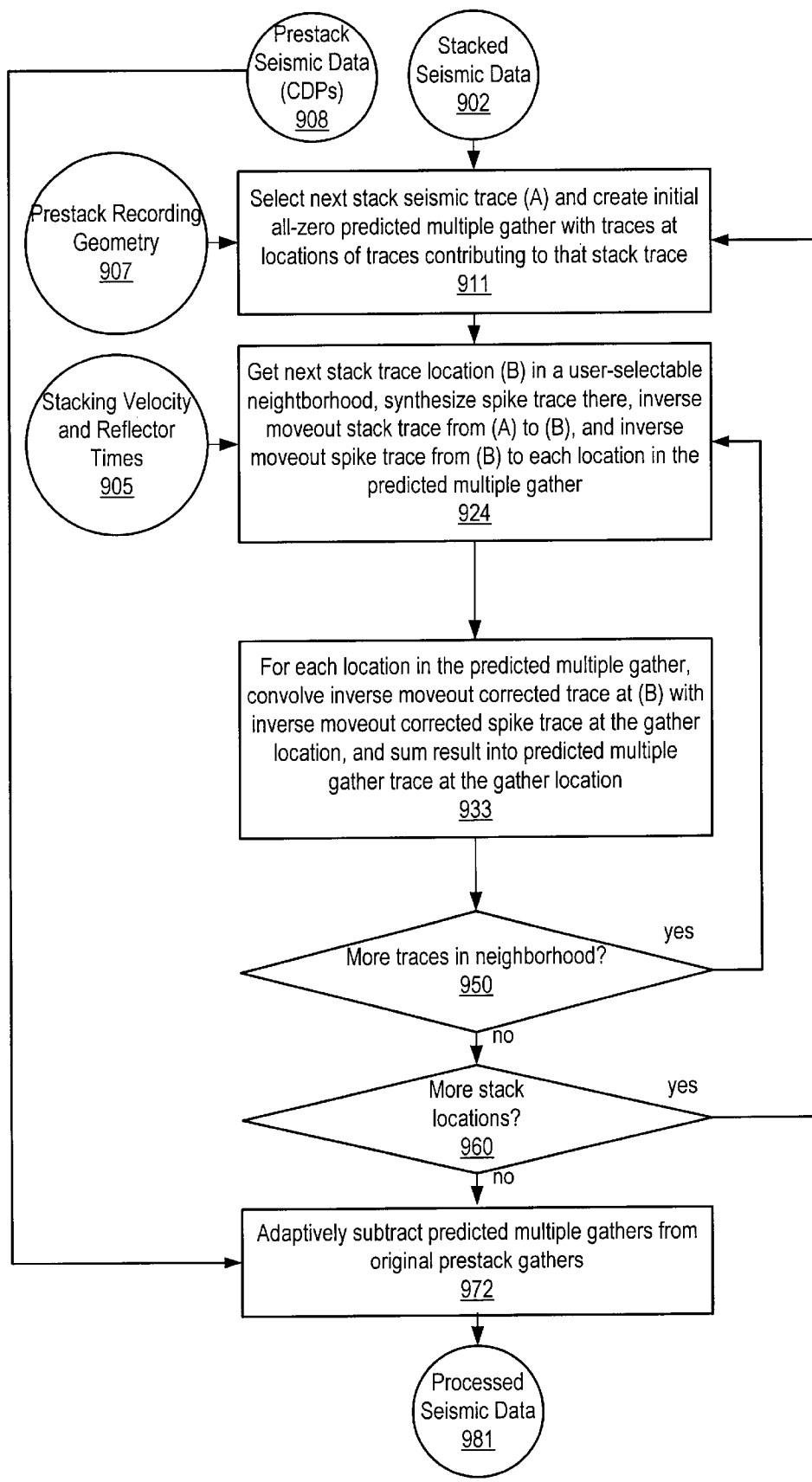

In another embodiment of the method of FIG. 9F, shown in FIG. 9G, rather than stacking predicted multiple gathers and adaptively subtracting the predicted multiple stack from the original stacked data in 971, in 972, the predicted multiple gathers may be adaptively subtracted from prestack seismic data (CDPs) 908, i.e., from original prestack gathers, thereby generating processed seismic data 981, as shown. In other words, in this embodiment, the stacked seismic data 902 are used (in conjunction with prestack recording geometry 907 and stacking velocity and reflector times 905) to predict the multiple gathers as described above with reference to FIG. 9F, but then the predicted multiple gathers are adaptively subtracted from prestack data 908, as opposed to subtracting the predicted gathers from the stacked seismic data 902.

Figure 9H:
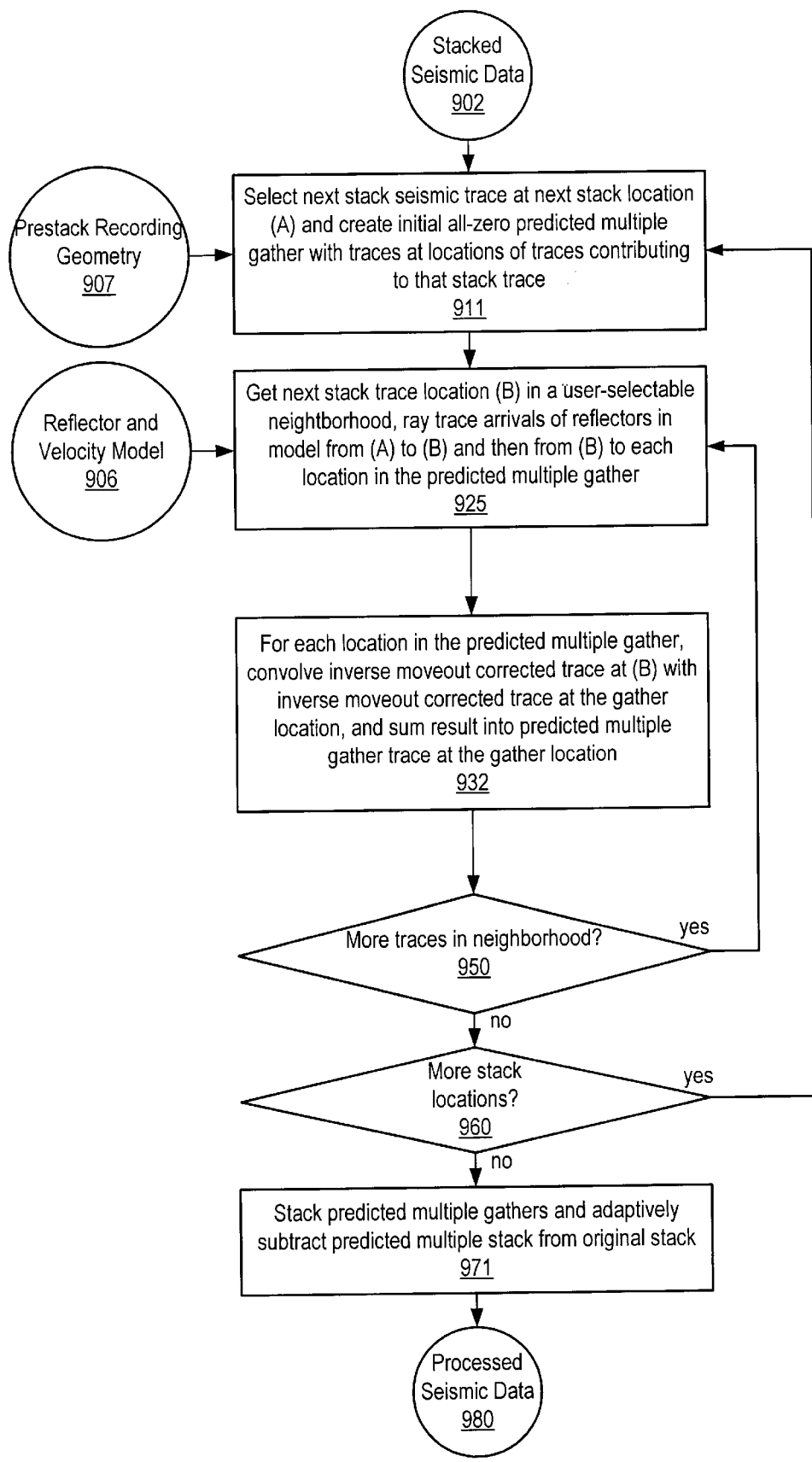

In the embodiment shown in FIG. 9H, a stacked seismic trace at stack seismic trace location A may be selected, and prestack recording geometry 907 may be utilized to create an initial all-zero predicted multiple gather with traces at locations of traces contributing to that stack seismic trace, as indicated in 911 and described above with reference to FIG. 9D.

Then, in 925, a next stack trace location B in a user-selectable neighborhood may be selected, and a reflector and velocity model used to ray trace arrivals of reflectors in the model from A to B, and then from B to each location in the predicted multiple gather, thereby generating an inverse moveout corrected trace at B, the neighborhood stack trace location, and an inverse moveout corrected trace at each location in the predicted multiple gather.

In 932, for each location in the predicted multiple gather: (1) the inverse moveout corrected trace at B may be convolved with the inverse moveout corrected trace at the location in the predicted multiple gather, and (2) the result summed into the predicted multiple gather trace at the predicted multiple gather location, as described above.

When there are no more traces in the neighborhood (950) and no more stack seismic trace locations to process (960), then in 971, the predicted multiple gathers may be stacked and adaptively subtracted from the original stack, as shown, thereby generating the processed seismic data 980.

Figure 9I:
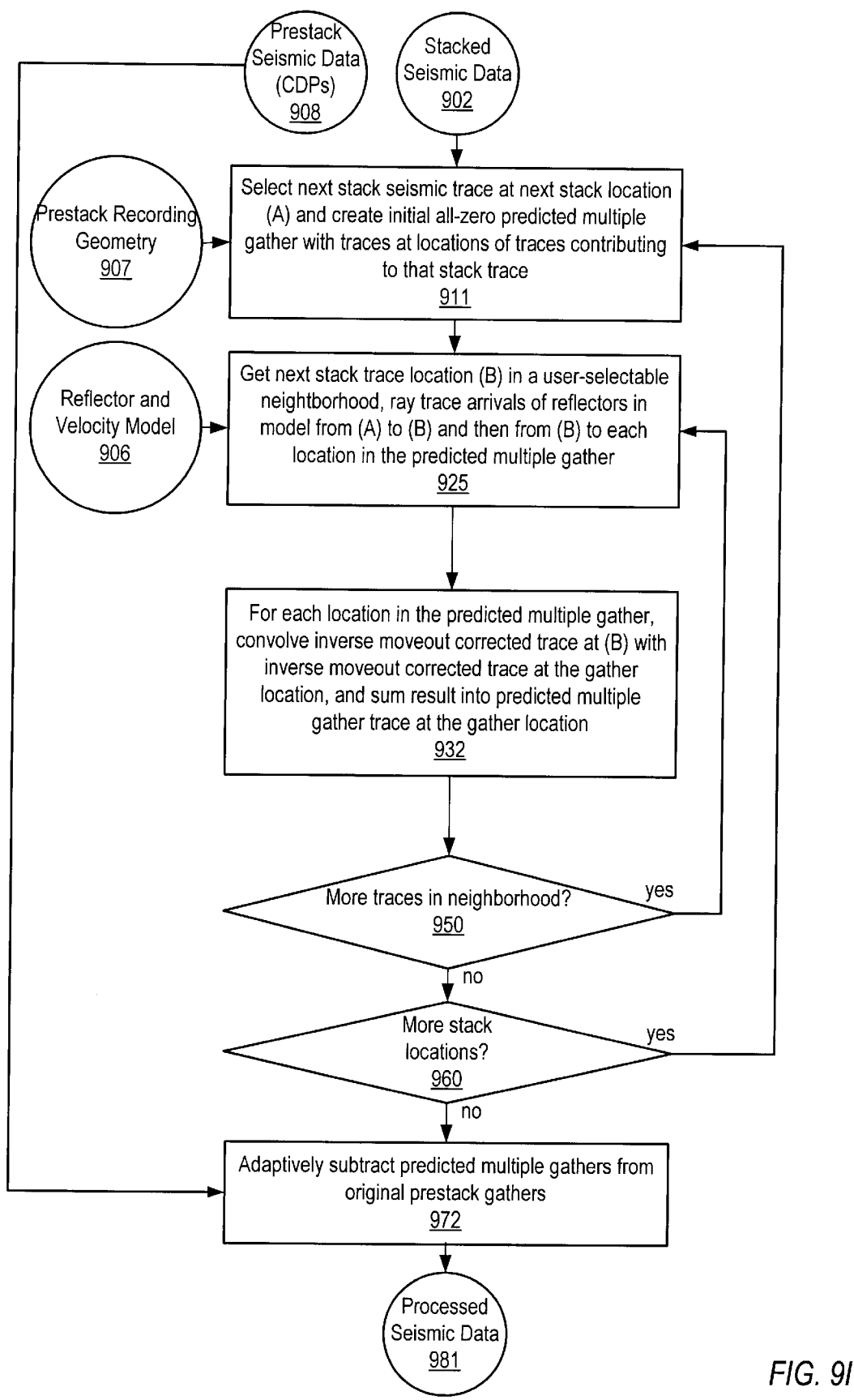

FIG. 9I illustrates a variant of the method of FIG. 9H. In this embodiment, rather than stacking predicted multiple gathers and adaptively subtracting the predicted multiple stack from the original stacked data in 971, in 972, the predicted multiple gathers may be adaptively subtracted from prestack seismic data (CDPs) 908, i.e., from original prestack gathers, thereby generating the processed seismic data 981, as shown. Said another way, in this embodiment, the stacked seismic data 902 are used in conjunction with prestack recording geometry 907 and a reflector and velocity model 906 to predict the multiple gathers as described above with reference to FIG. 9H, but then the predicted multiple gathers are adaptively subtracted from prestack data 908, as opposed to subtracting the predicted gathers from the stacked seismic data 902.

Thus, various embodiments may use various sources and forms of seismic data and velocity, including field data and models, to predict 3-D multiples. These predicted multiples may then be removed from the seismic data, and the remaining data analyzed to discover or characterize subsurface formations. For example, the formations may be analyzed to determine petroleum production potential for the area surveyed. Although an exemplary application of many embodiments is in exploration geophysics for petroleum production, it is noted that the methods described herein may be use in any application of geological surveying.

It should be noted that in other embodiments, the predicted 3-D multiples may not be removed or filtered from the seismic data, but may themselves be used to analyze or characterize subsurface structures, features, or environments. Thus, the predicted 3-D multiples may themselves be output by the method and used for seismic analysis. As also described above, in one exemplary use of the predicted multiples, the predicted multiples may be overlaid on seismic data to form a predicted multiples template, which, as is well known to those skilled in the art, may be of great use in analyzing and/or characterizing subsurface formations.

Thus, the above embodiments may synthesize 3-D nonzero-offset data from existing stacked traces and use these data in the 3-D Delft technique to predict multiples. It is noted that once the 3-D nonzero-offset data have been synthesized, the 3-D Delft technique may be applied in more than one way. For example, in one embodiment, one or more key reflectors may be selected and prestack areal data generated along hyperboloids characterized by local stacking velocity. The amplitudes and phases of these areal data may follow from standard formulas and may be modified to account for any known amplitude-versus-offset variations seen in the original prestack data used to create the stack. Alternatively, in another embodiment, instead of selecting specific traces, the prestack data may be generated by fanning every data sample of the stacked trace out along stacking-velocity trajectories, i.e., via inverse NMO.

The first approach has certain advantages over the second because a) the use of synthetics neatly sidesteps several thorny issues in wavelet estimation, and b) the resulting trace-to-trace convolutions may be performed with synthetic traces having very few live samples, effectively making the convolutions quite short, and thus reducing the computational burden. Conversely, the second approach avoids the need to decide in advance which reflectors constitute the most important generators of reverberations, a problem of combinatoric dimensions.

Note that both approaches, by allowing normal wavefield constructive and destructive interference to calculate a large suite of multiple arrivals simultaneously, avoid difficulties with multidimensional search through traveltime fields in order to identify specular rays for each potential reverberation path. Additionally, each approach is capable of generating multiple reflections that may not have their apex locations at zero-offset. Because the layout of the generated areal arrays can be made as regular as desired, Fourier convolution methods may sometimes be used to accelerate the speed of areal convolutions in the Delft approach.

As mentioned above, the computational burden of applying a Delft-like method in 3-D is potentially thousands or even millions of times more expensive than applying current 2-D implementations, which in itself is usually is measured in units of days of computer time. For this reason, the preferred embodiment specializes the full calculation to calculating only the zero (or near-zero) offset prediction for the multiple response, reducing the computational load considerably. As also described above, the load may be further reduced by limiting the location of traces used to predict the zero-offset response to fall within a user-selected distance from each stacked seismic trace, i.e., within a user-specified neighborhood.

The above described methods may decrease computation loads typically required to perform 3-D Delft-like computations by factors on the order of 1000, and possibly on the order of 1,000,000, and thus may substantially increase the feasibility of performing 3-D multiple predictions.

FIGS. 10–16—Examples

FIGS. 10–16 provide example seismic data illustrating various aspects of the various embodiments of the present invention. It is noted that the seismic data shown in FIGS. 10–16 have been synthesized or computed using computer models to more clearly illustrate the concepts described herein, in that real-world data are generally more complex so that the features and structures of interest are difficult to isolate for purposes of illustration. Nevertheless, the synthesized seismic data are accurate enough to illustrate the desired concepts.

Figure 10:
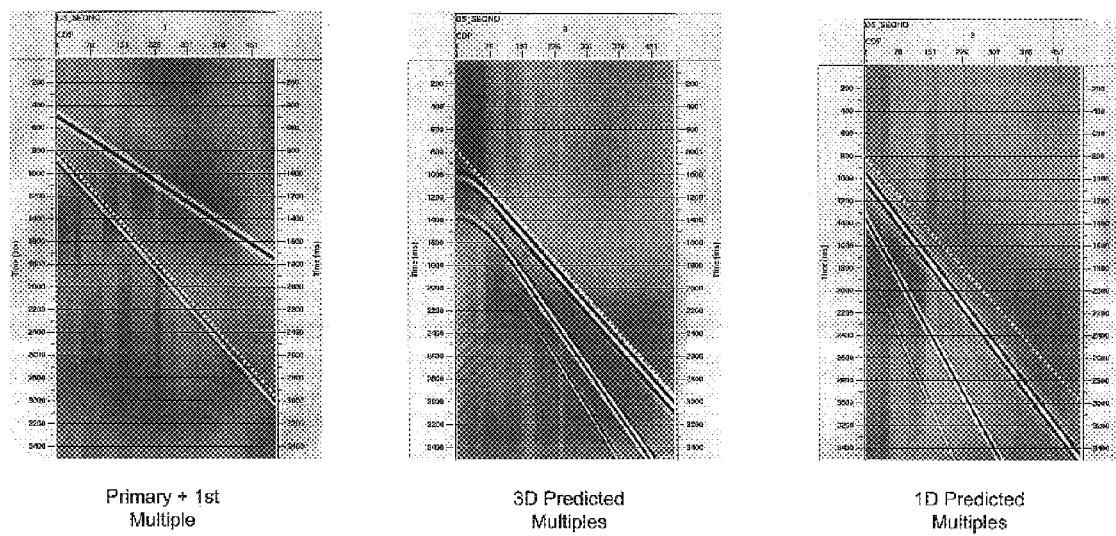
FIG. 10 illustrates an application of the present invention to a constant-velocity 30° dipping water bottom synthetic, according to one embodiment.

FIG. 10—Example: Dipping Water Bottom

FIG. 10 illustrates results of one embodiment of the method applied to a simple constant-velocity 30° dipping water bottom synthetic. The left hand panel, labeled "Primary+1$^{st}$ Multiple" illustrates this dipping water bottom (primary reflection) and its first surface multiple, highlighted by the dotted line. While the data are 3-D, only a representative cross-section is displayed. In this setting, the first multiple arrives at √3 times the waterbottom primary arrival time.

The center image, labeled "3D Predicted Multiples", shows the result of 3-D prestack/poststack multiple prediction on these data. This image contains only predicted multiple energy and no primaries. As indicated by the dotted line, the timing of the predicted first multiple is in direct agreement with the data, at least away from the edges of the data grid. This image also accurately predicts the second-order waterbottom multiple, although the corresponding data were not calculated in the original synthetic seismogram.

For comparison, the right-most image shows the result of Anstey and Newman's 1-D autoconvolution algorithm in predicting the multiples. That method assumes zero dip and incorrectly predicts the first waterbottom multiple arrival at twice the primary waterbottom arrival time.

Thus, from this simple example it may be seen that 3-D prestack/poststack multiple prediction may be of substantial practical value in seismic analysis and processing.

FIGS. 11–16—Example: SEG/EAGE Salt Model Dataset

Figure 11:
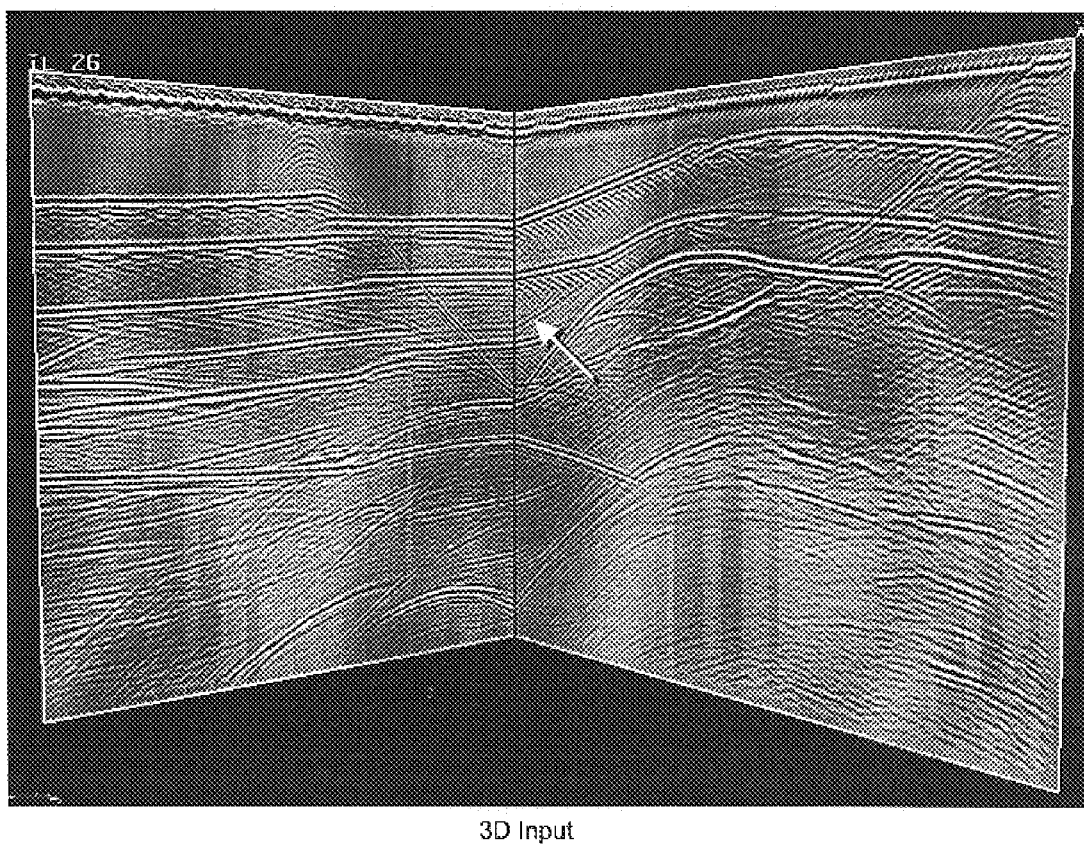
FIGS. 11–16 illustrate various aspects of the present invention applied to the 3-D SEG/EAGE Salt Model dataset, according to one embodiment.

As a second example of 3-D prestack/poststack multiple prediction, FIG. 11 illustrates the (3-D) SEG/EAGE Salt Model dataset. These data are the result of a massive computation designed to mimic many features found in real-world data, without contamination by random noise. FIGS. 12–16 illustrate various aspects of the present invention applied to this dataset. In this model there is no one unique dip or strike direction and thus 1-D or 2-D multiple predictions will generally be in error. FIG. 11 shows an inline and a crossline from a somewhat crude 3-D DMO stack volume. While all results shown have been calculated using the full 3-D stack volume, attention is focused on the highlighted surface multiple over a less complex portion of the model, both likely to fit the restrictions used in developing the 3-D prestack postack multiple prediction approach and easily identifiable as a multiple by one skilled in the art of seismic data analysis. To compensate for the DMO's effect on stacking velocities, the velocity field used in the prestack postack multiple prediction was boosted or amplified by dividing by the cosine of a nominal 30° dip angle.

Figure 12:
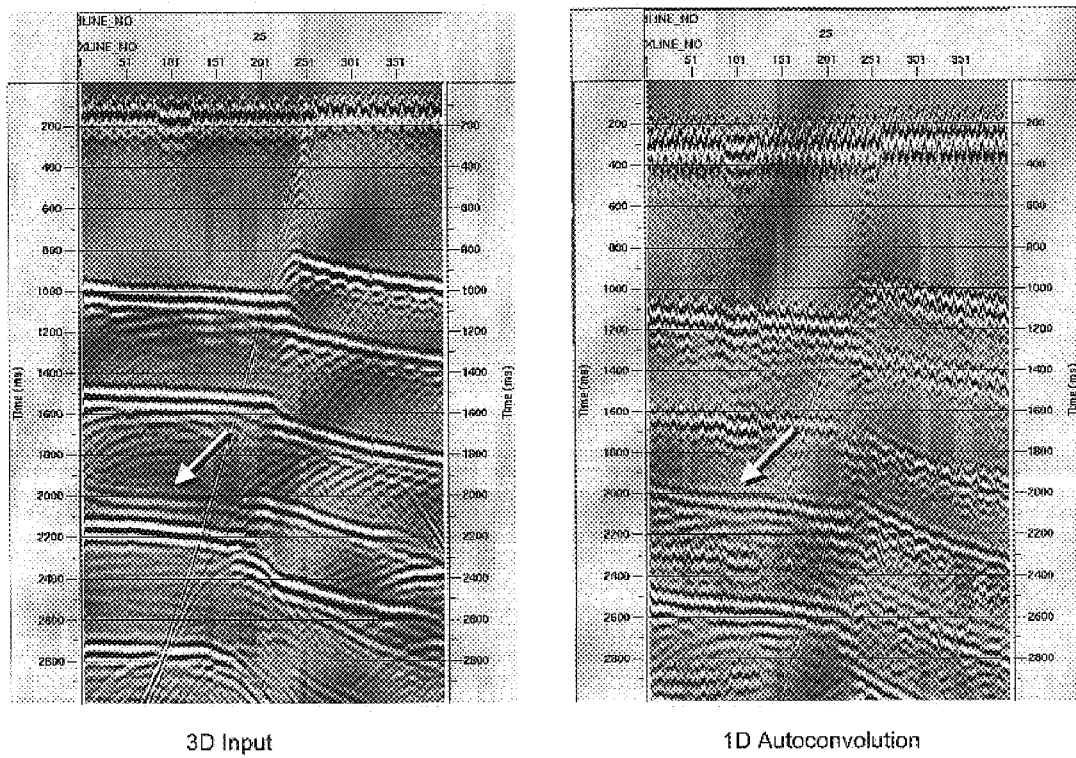

FIG. 12 illustrates the inline from FIG. 11, here shown in the left image labeled "3D Input". The right image, labeled "1D Autoconvolution" illustrates the multiples predicted by simple 1-D trace autoconvolution. Note that the same multiple that dips out of the plane of this section has been indicated in each image. As expected, 1-D autoconvolution predicts this multiple, though a bit later than the actual multiple due to the presence of crossdip.

Figure 13:
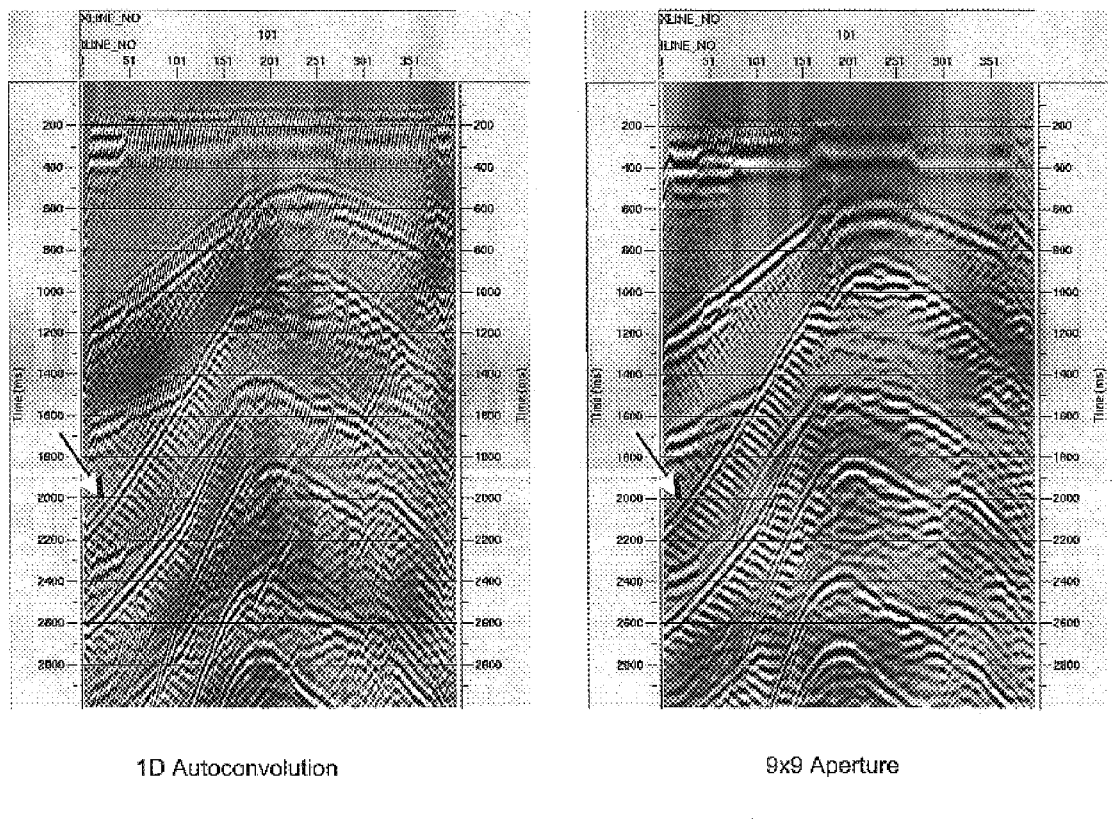

FIG. 13 illustrates the crossline section from FIG. 11. A 1-D autoconvolution multiple prediction is shown on the left, and output of a 9×9 CDP aperture 3-D prestack/ poststack multiple prediction is shown on the right. It is noted that these images display multiples only, i.e., no primaries are shown. As FIG. 13 shows, visually, the 3-D prediction is similar to the 1-D result, but the 3-D prediction (9×9 aperture image) displays more continuity and signal strength, suppressing much of the horizontal jitter that the sparse spacing of inlines has introduced into this particular DMO stack. Note that in the vicinity of the indicated multiple (see arrows), the 1-D result is a little over 50 milliseconds (msec) deeper than the 3-D prediction.

Figure 14:
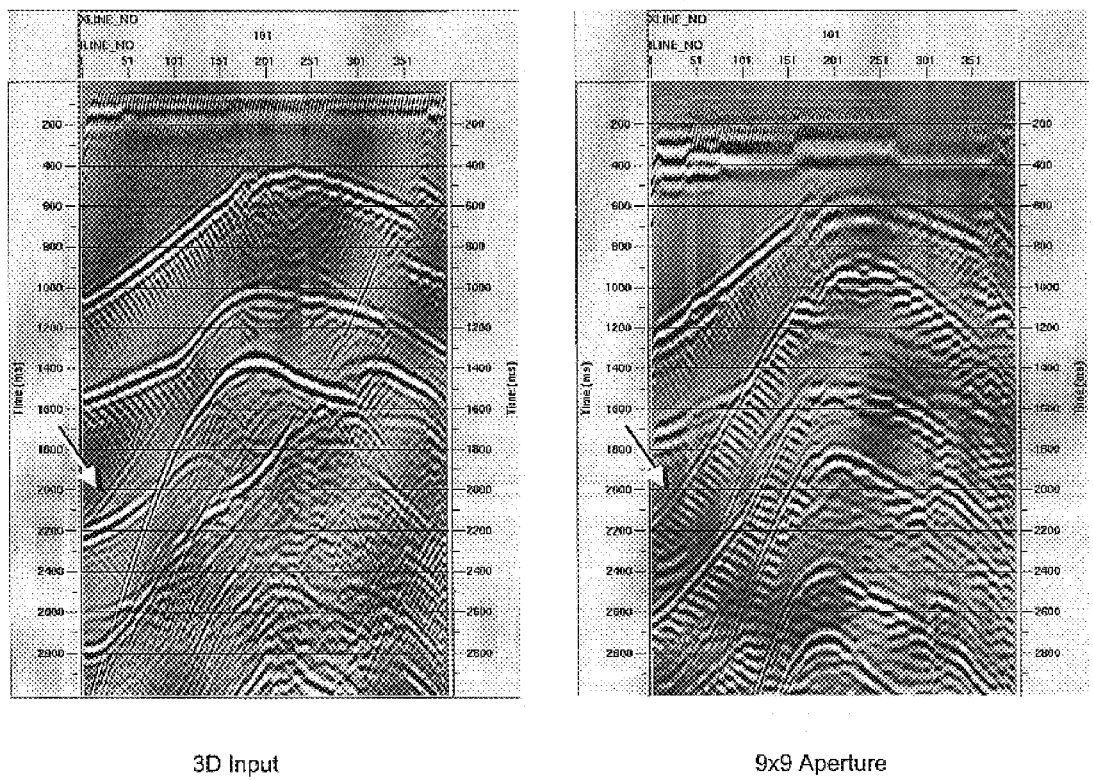

FIG. 14 illustrates the input section of the dataset of FIG. 11. As FIG. 14 shows, the 3-D multiple prediction is well aligned with the actual multiple in the input, again confirming that 3-D prestack/poststack multiple prediction handles out-of-plane 3-D dip effects.

Figure 15:
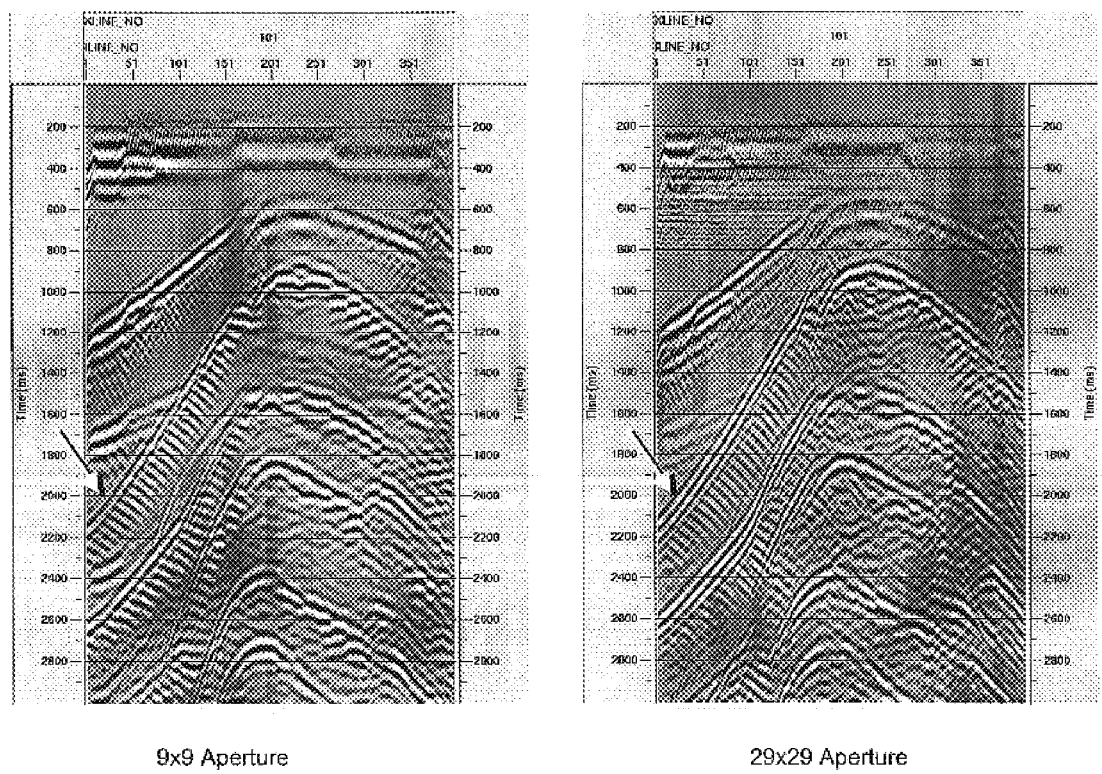

In FIG. 15, the 3-D prestack postack prediction aperture has been expanded to 29 CDPs in each direction. As FIG. 15 shows, while there are more edge-related effects with this wider aperture, the predictions for significantly dipping multiples have improved and, perhaps even more importantly, the predictions of 3-D diffracted multiples have expanded laterally as well.

Figure 16:
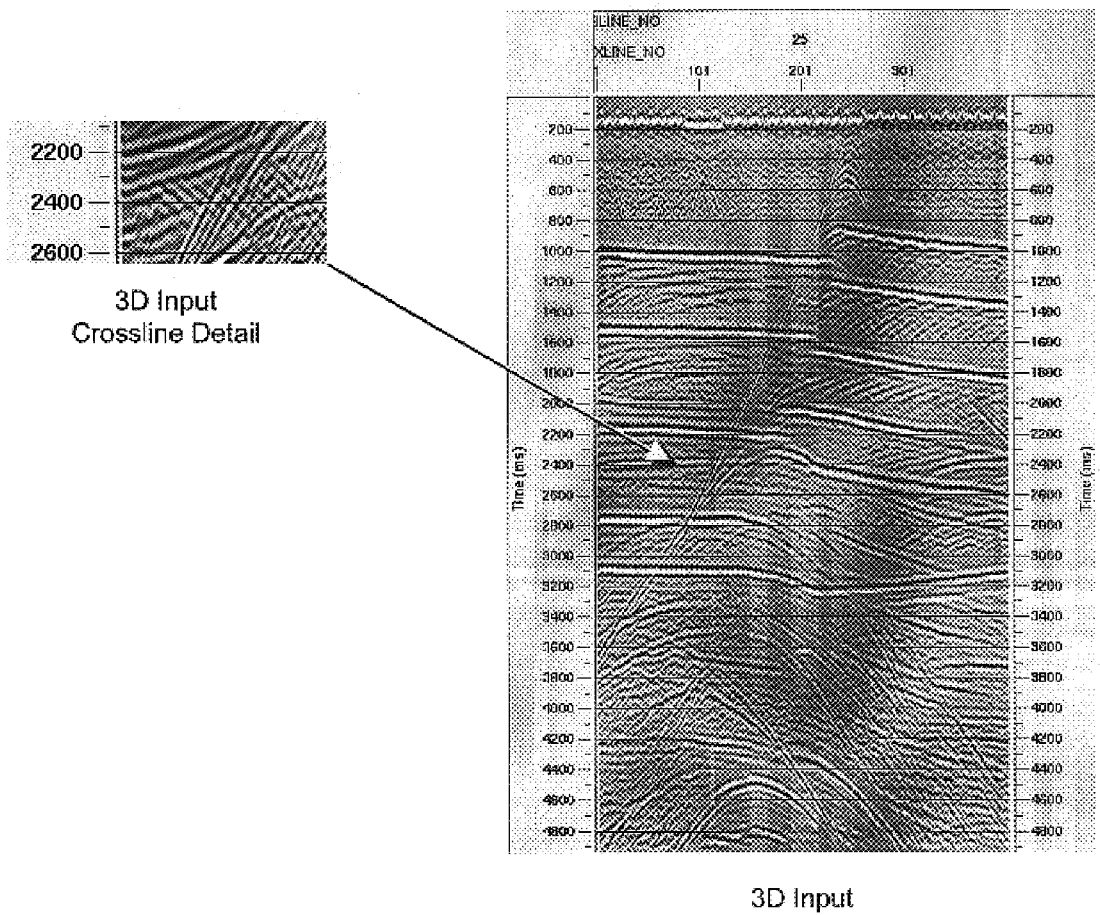

FIG. 16 shows a crossline detail from the 3D input seismic data of the SEG/EAGE Salt Model dataset to address the issue of whether the large aperture prediction (e.g., a 29×29 aperture) is better or worse than the small aperture (e.g., 9×9 aperture) prediction. More specifically, FIG. 16 provides a detailed enlargement of the original DMO stack volume in the crossline direction at the location in question. Note that this crossline view shows nothing flat, indicating that the inline section is primarily strike oriented at this particular location. The multiple energy that appears in this image comes from out of plane and therefore must be predicted from primary arrivals in other lines. This is further confirmed by the clear lack of any visible feature. in that zone mirroring the stair-step on the shallowest reflector. Thus, as FIG. 16 indicates, the larger aperture result is indeed an improvement over the small aperture prediction and is not an artifact of an invalidity of the assumptions or restrictions of the method.

DMO Issues

It should be noted that most, if not all, seismic data has DMO applied to it before stacking. Additionally, in general, post-DMO velocity picks are dip-compensated. In other words, most data are stacked after preprocessing with some form of dip moveout correction. Since 3D Delft theory assumes that DMO has not been applied, the question arises as to how to apply the above method to these data.

There are at least three options for handling the DMO issue, the first being to simply not do DMO. However, this approach may substantially restrict the data available for use by the method.

A second approach is to use normal moveout velocities picked on gathers prior to DMO for the prestack/poststack multiple prediction. This is quite a reasonable option, as the DMO stack has simply improved the quality of the stack for the majority of primary and multiple arrivals. However, attempting to use pre-DMO stacking velocities has the drawback that with limited azimuth data it becomes problematic to estimate the azimuthal dependency of stacking velocity.

A third and preferred alternative is to use the DMO stacking velocities directly. Although the DMO stacking velocities are dip-corrected velocities, one may still generally expect an improvement over autoconvolution for 3D multiple prediction. The near-offset traces of key shallow primaries may still be approximately correct, albeit more sharply curved (lower velocity) than those typically used by the method, and the structural dip in the stack remains the same. Therefore the predicted multiples, at least for moderate dips and structure, generally still move in the right direction, i.e., towards arrival times less than twice the sum of the contributing primary arrival times. This may thus provide a better, albeit partial, correction of autoconvolution times for 3D prediction of zero-offset multiple reflection arrivals. To help compensate, the DMO velocities may optionally be boosted by dividing them all by the cosine of a nominal dip angle. This has the beneficial effect of moving dipping energy further up-dip nearer its correct location while minimally perturbing flat energy, in accordance with theory.

Thus, in various embodiments, DMO stacking velocities may be used to produce results which, although possibly not as accurate as those produced from non-DMO stacking velocities, are still substantially superior to 1-D autoconvolution results.

Diffractions and their multiples are inherently 3-D phenomena, thus the ability to predict diffracted multiples in a 3-D sense is crucial in order to attenuate or remove them from seismic data. Various embodiments address the processing and/or interpretation of 3-D multiple reverberations. More specifically, 3-D prestack/poststack multiple prediction, which is grounded in 3-D Delft surface-related multiple theory, is an elegant and useful extension of 1-D autoconvolution to predict multiples in a truly 3-D manner, and may be particularly relevant to the problem of diffracted multiples. 3-D prestack/postack multiple prediction thus provides a feasible approach to achieving the goal of predicting 3-D multiples in seismic data.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for processing seismic data from a formation, the method comprising:

receiving stacked seismic data, wherein the stacked seismic data comprise a plurality of stack traces;

generating 3-dimensional (3-D) prestack traces from said plurality of stack traces by performing inverse moveout of each stack trace to each of a plurality of locations to compute a plurality of corresponding inverse moveout corrected traces comprising the 3-D prestack traces; and convolving the generated 3-D prestack traces to compute predicted multiples, wherein the predicted multiples are usable in analyzing the formation.

2. The method of claim 1, further comprising:

receiving a seismic data set acquired over said formation;

applying a transform to the predicted multiples to generate transformed predicted multiples; and applying said transform to the seismic data set to generate a transformed seismic data set;

wherein said transformed predicted multiples and said transformed seismic data set are in a format suitable for comparison.

3. The method of claim 2, wherein said transformed predicted multiples comprise a multiples template, the method further comprising:

overlaying the transformed predicted multiples on the transformed seismic data set to generate a multiples template;

wherein said multiples template is usable in analyzing the formation.

4. The method of claim 2, further comprising:

adaptively subtracting the transformed-predicted multiples from the transformed seismic data set.

5. The method of claim 1, further comprising:

receiving a seismic data set acquired over said formation;

adaptively subtracting the predicted multiples from the seismic data set.

6. The method of claim 5, wherein the received seismic data set comprises said stacked seismic data.

7. The method of claim 5, wherein the received seismic data set comprises prestack seismic data.

8. The method of claim 1, wherein said performing inverse moveout of each stack trace comprises performing inverse normal moveout (NMO) of each stack trace.

9. The method of claim 1, wherein said convolving the generated 3-D prestack traces to compute predicted multiples comprises:

convolving each inverse moveout corrected trace with itself to generate a corresponding autoconvolved trace; and summing the autoconvolved traces at each of the plurality of locations to compute said predicted multiples.

10. The method of claim 1, further comprising:

generating a plurality of spike traces corresponding to said inverse moveout corrected traces.

11. The method of claim 10, wherein said convolving the generated 3-D prestack traces to compute predicted multiples comprises:

convolving each inverse moveout corrected trace with a corresponding spike trace to generate a corresponding convolved trace; and summing the convolved traces at each of the plurality of locations to compute said predicted multiples.

12. The method of claim 1, wherein each said stacked trace has a stacked trace location, and wherein said plurality of locations comprises a user specified neighborhood around each stacked trace location.

13. The method of claim 1, wherein said performing inverse moveout of each stack trace comprises:

using a reflector and velocity model to ray trace arrivals of reflectors for inverse moveout parameterization, thereby generating corresponding inverse moveout corrected traces at each of the plurality of locations.

14. The method of claim 1, wherein each stack trace has a plurality of associated prestack source and receiver location pairs;

wherein said generating 3-D prestack traces from said stack traces comprises:

for each stack trace, for each source and receiver location pair associated with said stack trace, selecting an aperture, comprising a neighborhood of stack trace locations around the location of the stack trace;

for each stack trace location in the aperture, applying inverse moveout to a stack trace from the source location of said source and receiver location pair to said stack trace location in the aperture, thereby producing a first inverse moveout corrected trace; and applying inverse moveout to a stack trace from the receiver location of said source and receiver location pair to said stack trace location in the aperture, thereby producing a second inverse moveout corrected trace;

wherein said first inverse moveout corrected traces and said second inverse moveout corrected traces comprise the generated 3-D prestack traces.

15. The method of claim 14, wherein said convolving the generated 3-D prestack traces to compute predicted multiples comprises:

for each source and receiver location pair of said stack trace, for each stack trace location in the aperture, convolving the first inverse moveout corrected trace and the second inverse moveout corrected trace together to produce a convolved trace; and summing the convolved trace into a predicted multiple trace corresponding to the source and receiver location pair;

wherein the predicted multiple traces compose prestack predicted multiple gathers.

16. The method of claim 1, wherein each stack trace has a plurality of associated prestack source and receiver location pairs;

wherein said generating 3-D prestack traces from said stack traces comprises:

for each stack trace, for each source and receiver pair associated with said stack trace, selecting an aperture, comprising a neighborhood of stack trace locations around the location of the stack trace;

for each stack trace location in the aperture, applying inverse moveout to a spike trace from the source location of said source and receiver location pair to said stack trace location in the aperture, thereby producing a first inverse moveout corrected trace; and applying inverse moveout to a stack trace from the receiver location of said source and receiver location pair to said stack trace location in the aperture, thereby producing a second inverse moveout corrected trace;

wherein said first inverse moveout corrected traces and said second inverse moveout corrected traces comprise the generated 3-D prestack traces.

17. The method of claim 16, wherein said convolving the generated 3-D prestack traces to compute predicted multiples comprises:

for each source and receiver location pair of said stack trace, for each stack trace location in the aperture, convolving the first inverse moveout corrected trace and the second inverse moveout corrected trace together to produce a convolved trace; and summing the convolved trace into a predicted multiple trace corresponding to the source and receiver location pair;

wherein the predicted multiple traces compose prestack predicted multiple gathers.

18. The method of claim 1, wherein each stack trace has a plurality of associated prestack source and receiver location pairs;

wherein said generating 3-D prestack traces from said stack traces comprises:

for each stack trace, for each source and receiver pair associated with said stack trace, selecting an aperture, comprising a neighborhood of stack trace locations around the location of the stack trace;

for each stack trace location in the aperture, applying inverse moveout to a spike trace from the source location of said source and receiver location pair to said stack trace location in the aperture, thereby producing a first inverse moveout corrected trace; and applying inverse moveout to a spike trace from the receiver location of said source and receiver location pair to said stack trace location in the aperture, thereby producing a second inverse moveout corrected trace;

wherein said first inverse moveout corrected traces and said second inverse moveout corrected traces comprise the generated 3-D prestack traces.

19. The method of claim 18, wherein said convolving the generated 3-D prestack traces to compute predicted multiples comprises:

for each source and receiver location pair of said stack trace, for each stack trace location in the aperture, convolving the first inverse moveout corrected trace and the second inverse moveout corrected trace together to produce a convolved trace; and summing the convolved trace into a predicted multiple trace corresponding to the source and receiver location pair;

wherein the predicted multiple traces compose prestack predicted multiple gathers.

20. The method of claim 1, wherein said stacked seismic data comprise dip moveout (DMO) corrected data, including DMO velocities, and wherein said generating 3-dimensional (3-D) prestack traces from said plurality of stack traces comprises:

adjusting the DMO velocities for the stacked seismic data; and using the adjusted DMO velocities to generate said 3-D prestack traces from said plurality of stack traces.

21. The method of claim 20, wherein said adjusting DMO velocity comprises:
   dividing the DMO velocities by the cosine of a nominal dip angle.
22. The method of claim 1, further comprising:
   collecting seismic data from a plurality of source and receiver locations; and
   stacking the collected seismic data to produce said stacked seismic data.
23. The method of claim 1, wherein said generating 3-dimensional (3-D) prestack traces from the plurality of stack traces comprises:
   for each stack seismic trace location of a plurality of specified stack seismic trace locations:
      creating an initial all-zero predicted multiple trace;
      performing inverse moveout of each stack trace in a specified neighborhood to the selected stack seismic trace location using a stacking velocity, thereby generating corresponding inverse moveout corrected traces at the stack seismic trace location; and
   wherein said convolving the generated 3-D prestack traces to compute predicted multiples comprises:
      for each stack seismic trace location of said plurality of specified stack seismic trace locations:
         autoconvolving each inverse moveout corrected trace; and
         summing the autoconvolved trace into the predicted multiple trace at the stack seismic trace location.
24. The method of claim 23, further comprising:
   adaptively subtracting the predicted multiple traces from the stack traces.
25. The method of claim 23, further comprising:
   receiving a stacked seismic data set acquired over said formation;
   transforming the seismic data set and the predicted multiple traces to generate a transformed seismic data set and transformed predicted multiples,
   overlaying the transformed predicted multiples on the transformed seismic data set to generate a multiples template;
   wherein said multiples template is usable in analyzing the formation.
26. The method of claim 1, wherein said generating 3-dimensional (3-D) prestack traces from the plurality of stack traces comprises:
   for each stack seismic trace location of a plurality of specified stack seismic trace locations:
      creating an initial all-zero predicted multiple trace;
      for each stack trace in a specified neighborhood, wherein each stack trace has a trace location:
         synthesizing a spike trace at the trace location of the stack trace;
         performing inverse moveout to the selected stack trace and the spike trace, thereby generating corresponding inverse moveout corrected traces, wherein said synthesizing and said inverse moveout are performed using stacking velocity and reflector times; and
   wherein said convolving the generated 3-D prestack traces to compute predicted multiples comprises:
      for each stack seismic trace location of said plurality of specified stack seismic trace locations:
         convolving the inverse moveout corrected traces to generate a convolved trace; and
         summing the convolved trace into the predicted multiple trace at the stack seismic trace location.
27. The method of claim 26, further comprising:
   adaptively subtracting the predicted multiple traces from the stack traces.
28. The method of claim 26, further comprising:
   receiving a stacked seismic data set acquired over said formation;
   transforming the seismic data set and the predicted multiple traces to generate a transformed seismic data set and transformed predicted multiples,
   overlaying the transformed predicted multiples on the transformed seismic data set to generate a multiples template;
   wherein said multiples template is usable in analyzing the formation.
29. The method of claim 1, wherein said generating 3-dimensional (3-D) prestack traces from the plurality of stack traces comprises:
   for each stack seismic trace location of a plurality of specified stack seismic trace locations:
      creating an initial all-zero predicted multiple trace;
      for each stack trace in a specified neighborhood, ray tracing arrivals of reflectors for inverse moveout parameterization using a reflector and velocity model, thereby generating corresponding inverse moveout corrected traces at the stack seismic trace location; and
   wherein said convolving the generated 3-D prestack traces to compute predicted multiples comprises:
      for each stack seismic trace location of said plurality of specified stack seismic trace locations:
         autoconvolving each inverse moveout corrected trace; and
         summing the autoconvolved trace into the predicted multiple trace at the stack seismic trace location.
30. The method of claim 29, further comprising:
   adaptively subtracting the predicted multiple traces from the stack traces.
31. The method of claim 29, further comprising:
   receiving a stacked seismic data set acquired over said formation;
   transforming the seismic data set and the predicted multiple traces to generate a transformed seismic data set and transformed predicted multiples,
   overlaying the transformed predicted multiples on the transformed seismic data set to generate a multiples template;
   wherein said multiples template is usable in analyzing the formation.
32. The method of claim 1, wherein said generating 3-dimensional (3-D) prestack traces from the plurality of stack traces comprises:
   for each stack seismic trace location of a plurality of specified stack seismic trace locations:
      for a stack seismic trace at the stack seismic trace location, using prestack recording geometry to create an initial all-zero predicted multiple gather with traces at the locations of traces contributing to the stack seismic trace;
      using a stacking velocity, performing inverse moveout of the stack seismic trace to each stack trace location in a specified neighborhood to generate corresponding inverse moveout corrected traces at said stack trace locations in the specified neighborhood; and
      using the stacking velocity, performing inverse moveout of a stack trace at each stack trace location in said specified neighborhood to each location in the predicted multiple gather, thereby generating corresponding inverse moveout corrected traces at each location in the predicted multiple gather; and wherein said convolving the generated 3-D prestack traces to compute predicted multiples comprises:
for each stack seismic trace location of said plurality of specified stack seismic trace locations:
for each location in the predicted multiple gather:
convolving each inverse moveout corrected trace at said stack trace locations in the specified neighborhood with the inverse moveout corrected trace at the location in the predicted multiple gather; and
summing the convolved traces into the predicted multiple trace at the location in the predicted multiple gather.

33. The method of claim 32, further comprising:
stacking the predicted multiple gathers to generate a predicted multiple stack; and
adaptively subtracting the predicted multiple stack from the stacked seismic data.

34. The method of claim 32, further comprising:
receiving a stacked seismic data set acquired over said formation;
transforming the seismic data set and a stack of the predicted multiple gather of to generate a transformed seismic data set and transformed predicted multiples,
overlaying the transformed predicted multiples on the transformed seismic data set to generate a multiples template;
wherein said multiples template is usable in analyzing the formation.

35. The method of claim 32, further comprising:
using prestack seismic data comprising prestack gathers, adaptively subtracting the predicted multiple gathers from the prestack gathers.

36. The method of claim 1, wherein said generating 3-dimensional (3-D) prestack traces from the plurality of stack traces comprises:
for each stack seismic trace location of a plurality of specified stack seismic trace locations:
for a stack seismic trace at the stack seismic trace location, using prestack recording geometry to create an initial all-zero predicted multiple gather with traces at the locations of traces contributing to the stack seismic trace;
synthesizing a spike trace at each stack trace location in a specified neighborhood;
using a stacking velocity and reflector times, performing inverse moveout of the stack seismic trace to said stack trace locations, thereby generating corresponding inverse moveout corrected traces at said stack trace locations in the specified neighborhood; and
using the stacking velocity and reflector times, performing inverse moveout of the spike trace at each stack trace location in said specified neighborhood to each location in the predicted multiple gather, thereby generating corresponding inverse moveout corrected spike traces at each location in the predicted multiple gather; and
wherein said convolving the generated 3-D prestack traces to compute predicted multiples comprises:
for each stack seismic trace location of said plurality of specified stack seismic trace locations:
for each location in the predicted multiple gather:
convolving the inverse moveout corrected trace at each stack trace location in the specified neighborhood with the inverse moveout corrected spike trace at the location in the predicted multiple gather; and
summing the convolved traces into the predicted multiple trace at the location in the predicted multiple gather.

37. The method of claim 36, further comprising:
stacking the predicted multiple gathers to generate a predicted multiple stack; and
adaptively subtracting the predicted multiple stack from the stacked seismic data.

38. The method of claim 36, further comprising:
receiving a seismic data set acquired over said formation;
transforming the seismic data set and the predicted multiple gathers to generate a transformed seismic data set and transformed predicted multiples.
overlaying the transformed predicted multiples on the transformed seismic data set to generate a multiples template;
wherein said multiples template is usable in analyzing the formation.

39. The method of claim 36, further comprising:
using prestack seismic data comprising prestack gathers, adaptively subtracting the predicted multiple gathers from the prestack gathers.

40. The method of claim 1, wherein said generating 3-dimensional (3-D) prestack traces from the plurality of stack traces comprises:
for each stack seismic trace location of a plurality of specified stack seismic trace locations:
for a stack seismic trace at the stack seismic trace location, using prestack recording geometry to create an initial all-zero predicted multiple gather with traces at the locations of traces contributing to the stack seismic trace;
using a reflector and velocity model, ray tracing arrivals of reflectors in said model for said stack seismic trace to each stack trace location in a specified neighborhood, thereby generating inverse moveout corrected traces at said stack trace locations in the specified neighborhood;
using said reflector and velocity model, ray tracing arrivals of reflectors in said model for a stack trace at each stack trace location in said specified neighborhood to each location in the predicted multiple gather, thereby generating corresponding inverse moveout corrected traces at each location in the predicted multiple gather; and
wherein said convolving the generated 3-D prestack traces to compute predicted multiples comprises:
for each stack seismic trace location of said plurality of specified stack seismic trace locations:
for each location in the predicted multiple gather:
convolving the inverse moveout corrected trace at each stack trace location in the specified neighborhood with the inverse moveout corrected trace at the location in the predicted multiple gather; and
summing the convolved traces into the predicted multiple trace at the location in the predicted multiple gather.

41. The method of claim 40, further comprising:

stacking the predicted multiple gathers to generate a predicted multiple stack; and adaptively subtracting the predicted multiple stack from the stacked seismic data.

42. The method of claim 40 further comprising:

receiving a seismic data set acquired over said formation;

transforming the seismic data set and the predicted multiple gather to generate a transformed seismic data set and transformed predicted multiples.

overlaying the transformed predicted multiples on the transformed seismic data set to generate a multiples template;

wherein said multiples template is usable in analyzing the formation.

43. The method of claim 40, further comprising:

using prestack seismic data comprising prestack gathers to adaptively subtract the predicted multiple gathers from the prestack gathers.

44. The method of claim 1, further comprising:

analyzing the formation to determine petroleum production potential.

45. The method of claim 1, wherein said convolving the generated 3-D traces to compute predicted multiples comprises:

applying time-variant scaling and/or time-variant filtering to the generated 3-D traces to generate scaled and/or filtered 3-D traces;

convolving the scaled and/or filtered 3-D traces to generate convolved traces; and summing the convolved traces to generate the predicted multiples.

46. The method of claim 1, wherein said convolving the generated 3-D traces to compute predicted multiples comprises:

convolving the 3-D traces to generate convolved traces;

performing time-variant scaling and/or time-variant filtering on the convolved traces to generate modified traces; and summing the modified traces to generate the predicted multiples.

47. The method of claim 1, wherein said convolving the generated 3-D traces to compute predicted multiples comprises:

applying time-variant scaling and/or time-variant filtering to the generated 3-D traces to generate scaled and/or filtered 3-D traces;

convolving the scaled and/or filtered 3-D traces to generate convolved traces;

performing time-variant scaling and/or time-variant filtering on the convolved traces to generate modified traces; and summing the modified traces to generate the predicted multiples.

48. A system for processing seismic data from a formation, the system comprising:

a processor;

a memory medium coupled to the processor;

an input coupled to the processor and the memory medium; and an output coupled to the processor and the memory medium;

wherein the input is operable to:

receive stacked seismic data, wherein the stacked seismic data comprise a plurality of stack traces;

wherein the memory medium stores program instructions which are executable by the processor to:

generate 3-dimensional (3-D) prestack traces from said plurality of stack traces; and convolve and combine the generated 3-D prestack traces to compute predicted multiples, wherein the predicted multiples are usable in analyzing the formation.

49. The system of claim 48, wherein the program instructions are further executable by the processor to:

perform inverse moveout of each stack trace to each of a plurality of locations to compute a plurality of corresponding inverse moveout corrected traces comprising the 3-D prestack traces.

50. A system for processing seismic data from a formation, the system comprising:

means for receiving stacked seismic data, wherein the stacked seismic data comprise a plurality of stack traces;

means for generating 3-dimensional (3-D) prestack traces from said plurality of stack traces by performing inverse moveout of each stack trace to each of a plurality of locations to compute a plurality of corresponding inverse moveout corrected traces comprising the 3-D prestack traces; and means for convolving and combining the generated 3-D prestack traces to compute predicted multiples, wherein the predicted multiples are usable in analyzing the formation.

51. A carrier medium which stores program instructions for processing seismic data from a formation, wherein the program instructions are executable to perform:

receiving stacked seismic data, wherein the stacked seismic data comprise a plurality of stack traces;

generating 3-dimensional (3-D) prestack traces from said plurality of stack traces by performing inverse moveout of each stack trace to each of a plurality of locations to compute a plurality of corresponding inverse moveout corrected traces comprising the 3-D prestack traces; and convolving and combining the generated 3-D prestack traces to compute predicted multiples, wherein the predicted multiples are usable in analyzing the formation.

* * * * *

UNITED STATES PATENT AND TRADEMARK OFFICE
CERTIFICATE OF CORRECTION

PATENT NO. : 6,735,527 B1
DATED : May 11, 2004
INVENTOR(S) : Levin

It is certified that error appears in the above-identified patent and that said Letters Patent is hereby corrected as shown below:

Column 24,
Line 36, please delete "transformed-predicted" and substitute -- transformed predicted --.

Signed and Sealed this

Fourteenth Day of September, 2004

JON W. DUDAS
*Director of the United States Patent and Trademark Office*